US012654551B2

(12) United States Patent     (10) Patent No.:   US 12,654,551 B2

Noll et al.     (45) Date of Patent:   Jun. 16, 2026

(54) METHOD FOR DISPLAYING GRAPHICAL DATA ON AN ELECTRONIC DISPLAY

(71) Applicant: Deere & Company, Moline, IL (US)

(72) Inventors: Andrew L. Noll, Dubuque, IA (US); Hanna J. Wickman, Grimes, IA (US); Joy Vuijk, Johnston, IA (US); Jenna L. Rettenberger, Dubuque, IA (US)

(73) Assignee: Deere & Company, Moline, IL (US)

( * ) Notice: Subject to any disclaimer, the term of this patent is extended or adjusted under 35 U.S.C. 154(b) by 270 days.

(21) Appl. No.: 18/594,743

(22) Filed: Mar. 4, 2024

(65) Prior Publication Data

US 2024/0308340 A1     Sep. 19, 2024

Related U.S. Application Data

(60) Provisional application No. 63/489,903, filed on Mar. 13, 2023.

(51) Int. Cl.
   *B60K 35/22*     (2024.01)
   *B60K 35/215*     (2024.01)

(52) U.S. Cl.
   CPC ............ *B60K 35/22* (2024.01); *B60K 35/215* (2024.01); *B60K 2360/115* (2024.01)

(58) Field of Classification Search
None
See application file for complete search history.

(56) References Cited

U.S. PATENT DOCUMENTS

D592,153 S    5/2009   Engel et al.
D619,615 S    7/2010   Hoffmann et al.
               (Continued)

OTHER PUBLICATIONS

Cat Mini Excavator Bucket, Dec. 16, 2022, YouTube, [online], [retrieved on Jun. 21, 2024]. Retrieved from the Internet <URL: https://www.youtube.com/watch?v=DBOyTBd-QMU>.

(Continued)

*Primary Examiner* — James J Lee
*Assistant Examiner* — Elizabeth Galyn Martinez

(57) ABSTRACT

An electronic data processor is configured to determine the display mode based on user input comprising user-inputted control states, user-inputted actuator states and machine-provided sensor states provided by reading a vehicle data bus or sensor data communication. In a first mode, the electronic data processor is configured to populate the tell-tale container of a first size with primary priority icons and secondary priority icons. In the second mode, the electronic data processor is configured to populate the critical ribbon container of a second size solely with primary priority icons, where the first size is greater than the second size by a first size difference, and populating an app container in the second residual container with an application. Further, the electronic data processor is configured to display the populated tell-tale container in the first mode in conjunction with the first residual container or the populated critical ribbon in the second mode in conjunction with the second residual container responsive based on the determination of the display mode, wherein the first residual container is resized into the second residual container of greater size than the first residual information.

6 Claims, 23 Drawing Sheets
(15 of 23 Drawing Sheet(s) Filed in Color)

(56) References Cited

U.S. PATENT DOCUMENTS

| | | | |
|---|---|---|---|
| D693,834 | S | 11/2013 | Ito et al. |
| D746,836 | S | 1/2016 | Mariet et al. |
| 9,227,478 | B2 | 1/2016 | Horstman |
| D750,115 | S | 2/2016 | Kettner et al. |
| D781,885 | S | 3/2017 | Bhat et al. |
| D790,571 | S | 6/2017 | Deusing et al. |
| D820,285 | S | 6/2018 | Haverinen et al. |
| D834,593 | S | 11/2018 | Lehmann |
| 10,209,235 | B2 * | 2/2019 | Cotton ............... A01D 41/1273 |
| 10,300,898 | B2 | 5/2019 | Kale et al. |
| D854,032 | S | 7/2019 | Jones et al. |
| D864,977 | S | 10/2019 | Lehmann |
| D872,753 | S | 1/2020 | Ebler et al. |
| D879,143 | S | 3/2020 | Reichert et al. |
| D884,010 | S | 5/2020 | Lenz, Jr. |
| D890,200 | S | 7/2020 | Kokubo et al. |
| D892,158 | S | 8/2020 | Jedrzejowicz et al. |
| D910,063 | S | 2/2021 | Brooks |
| D941,862 | S | 1/2022 | Folken et al. |
| D950,597 | S | 5/2022 | Hashimoto et al. |
| D965,610 | S | 10/2022 | Haverinen et al. |
| 2009/0174682 | A1 | 7/2009 | Bowden et al. |
| 2015/0188720 | A1 | 7/2015 | Winter |
| 2018/0040114 | A1 | 2/2018 | Stroupe |
| 2021/0103367 | A1 | 4/2021 | Havins |
| 2021/0237576 | A1 * | 8/2021 | Jahns .................... B60K 35/10 |
| 2021/0366211 | A1 | 11/2021 | Hogan |
| 2023/0311653 | A1 * | 10/2023 | Grammatico ......... G06F 3/0482 |
| | | | 701/101 |

OTHER PUBLICATIONS

Dashboard Warning Lights What Do They Mean On Your CAR, Dec. 16, 2022, YouTube, [online], [retrieved on Jun. 21, 2024]. Retrieved from the Internet <URL: https://www.youtube.com/watch?v=12QBOrLRtMk>.

Komatsu dealer Service Side of the Monitor Dozer, Apr. 11, 2019, YouTube, [online], [retrieved on Jun. 21, 2024]. Retrieved from the Internet <URL: https://www.youtube.com/watch?v=JNficyP-4hQ >.

* cited by examiner

Figure 4A:
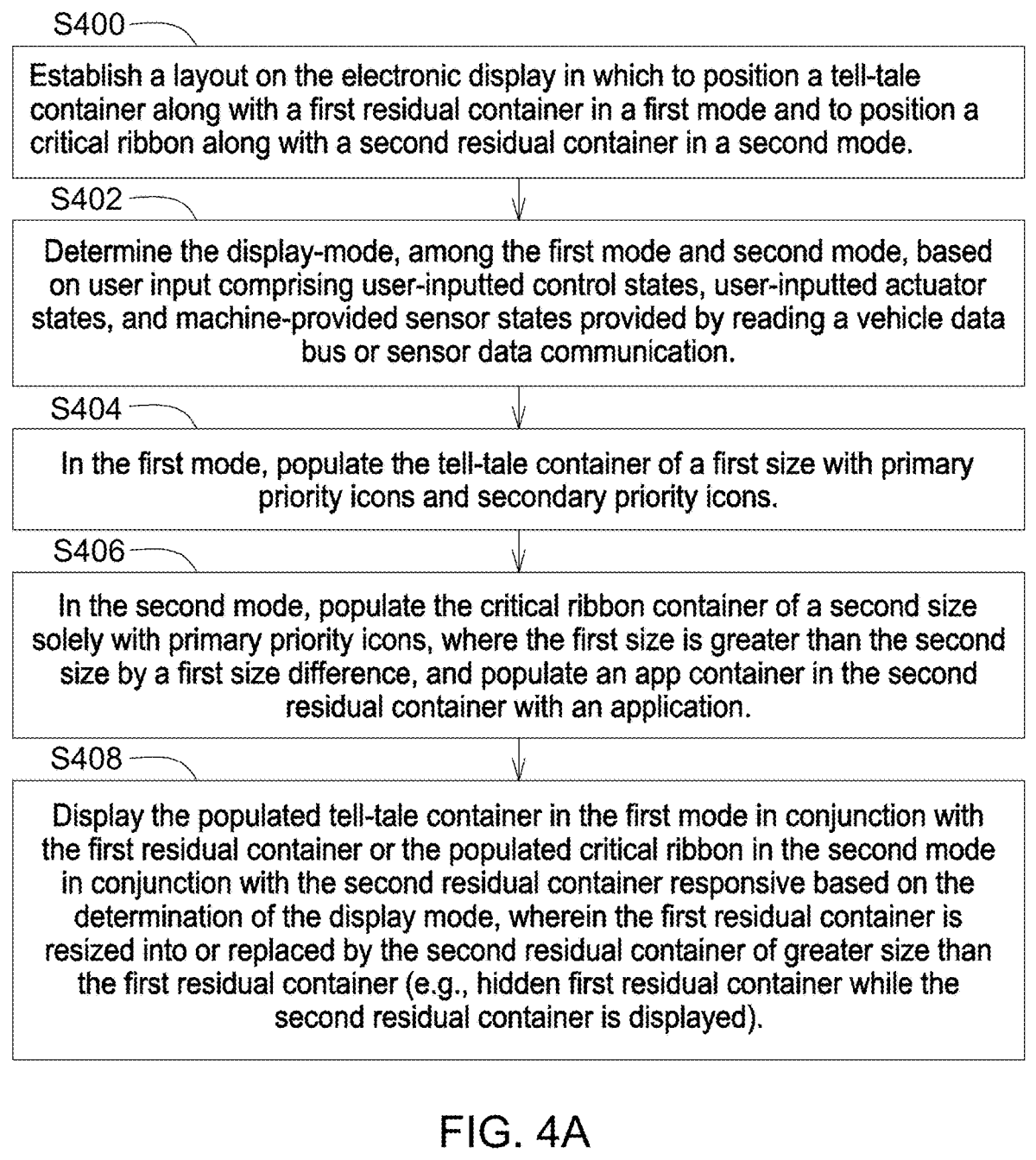

S400

Establish a layout on the electronic display in which to position a tell-tale container along with a first residual container in a first mode and to position a critical ribbon along with a second residual container in a second mode.

S402

Determine the display-mode, among the first mode and second mode, based on user input comprising user-inputted control states, user-inputted actuator states, and machine-provided sensor states provided by reading a vehicle data bus or sensor data communication.

S404

In the first mode, populate the tell-tale container of a first size with primary priority icons and secondary priority icons.

S406

In the second mode, populate the critical ribbon container of a second size solely with primary priority icons, where the first size is greater than the second size by a first size difference, and populate an app container in the second residual container with an application.

S408

Display the populated tell-tale container in the first mode in conjunction with the first residual container or the populated critical ribbon in the second mode in conjunction with the second residual container responsive based on the determination of the display mode, wherein the first residual container is resized into or replaced by the second residual container of greater size than the first residual container (e.g., hidden first residual container while the second residual container is displayed).

Figure 4B:
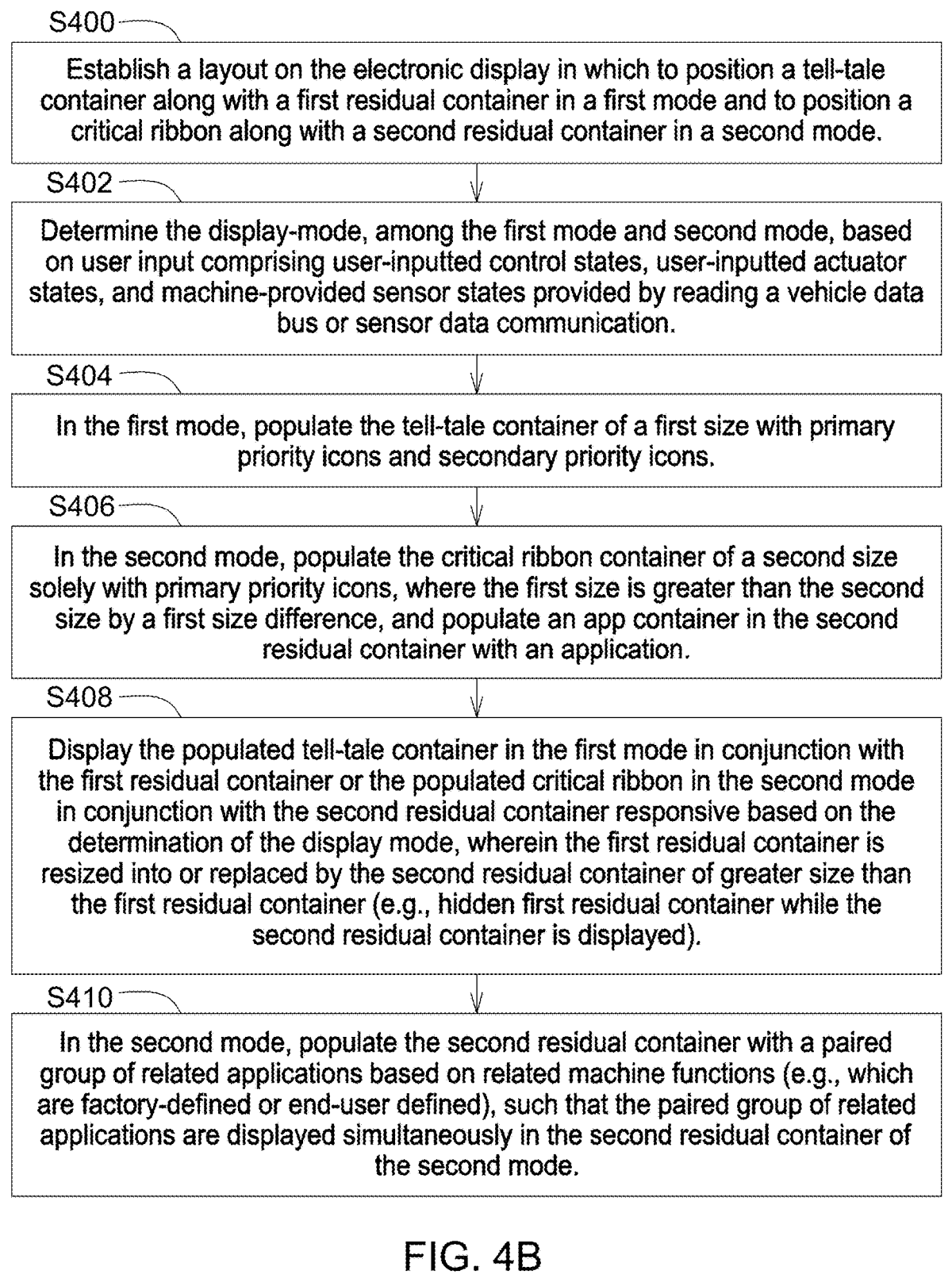

Establish a layout on the electronic display in which to position a tell-tale container along with a first residual container in a first mode and to position a critical ribbon along with a second residual container in a second mode.

S402

Determine the display-mode, among the first mode and second mode, based on user input comprising user-inputted control states, user-inputted actuator states, and machine-provided sensor states provided by reading a vehicle data bus or sensor data communication.

S404

In the first mode, populate the tell-tale container of a first size with primary priority icons and secondary priority icons.

S406

In the second mode, populate the critical ribbon container of a second size solely with primary priority icons, where the first size is greater than the second size by a first size difference, and populate an app container in the second residual container with an application.

S408

Display the populated tell-tale container in the first mode in conjunction with the first residual container or the populated critical ribbon in the second mode in conjunction with the second residual container responsive based on the determination of the display mode, wherein the first residual container is resized into or replaced by the second residual container of greater size than the first residual container (e.g., hidden first residual container while the second residual container is displayed).

S410

In the second mode, populate the second residual container with a paired group of related applications based on related machine functions (e.g., which are factory-defined or end-user defined), such that the paired group of related applications are displayed simultaneously in the second residual container of the second mode.

Figure 4C:
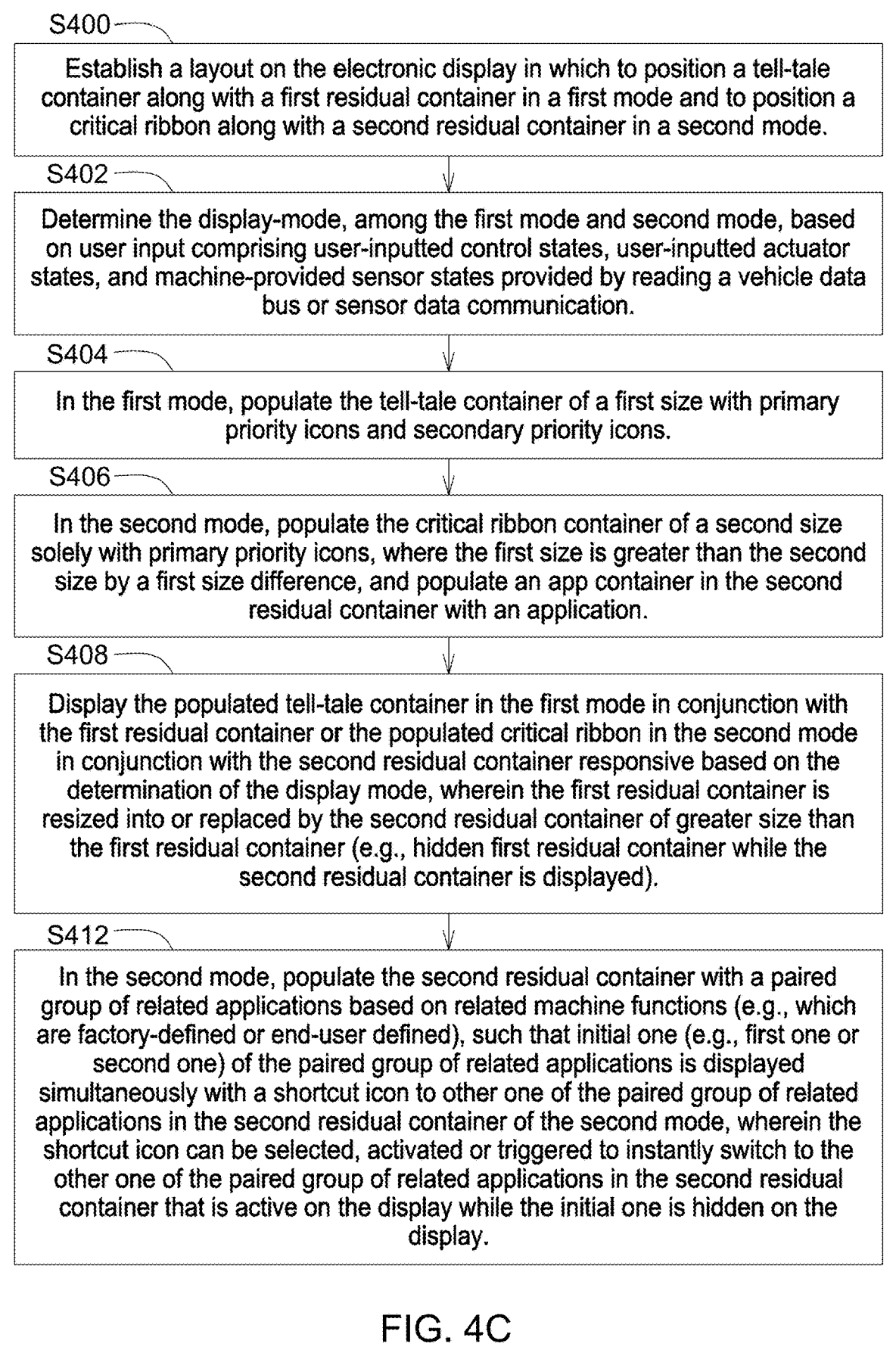

Establish a layout on the electronic display in which to position a tell-tale container along with a first residual container in a first mode and to position a critical ribbon along with a second residual container in a second mode.

S402

Determine the display-mode, among the first mode and second mode, based on user input comprising user-inputted control states, user-inputted actuator states, and machine-provided sensor states provided by reading a vehicle data bus or sensor data communication.

S404

In the first mode, populate the tell-tale container of a first size with primary priority icons and secondary priority icons.

S406

In the second mode, populate the critical ribbon container of a second size solely with primary priority icons, where the first size is greater than the second size by a first size difference, and populate an app container in the second residual container with an application.

S408

Display the populated tell-tale container in the first mode in conjunction with the first residual container or the populated critical ribbon in the second mode in conjunction with the second residual container responsive based on the determination of the display mode, wherein the first residual container is resized into or replaced by the second residual container of greater size than the first residual container (e.g., hidden first residual container while the second residual container is displayed).

S412

In the second mode, populate the second residual container with a paired group of related applications based on related machine functions (e.g., which are factory-defined or end-user defined), such that initial one (e.g., first one or second one) of the paired group of related applications is displayed simultaneously with a shortcut icon to other one of the paired group of related applications in the second residual container of the second mode, wherein the shortcut icon can be selected, activated or triggered to instantly switch to the other one of the paired group of related applications in the second residual container that is active on the display while the initial one is hidden on the display.

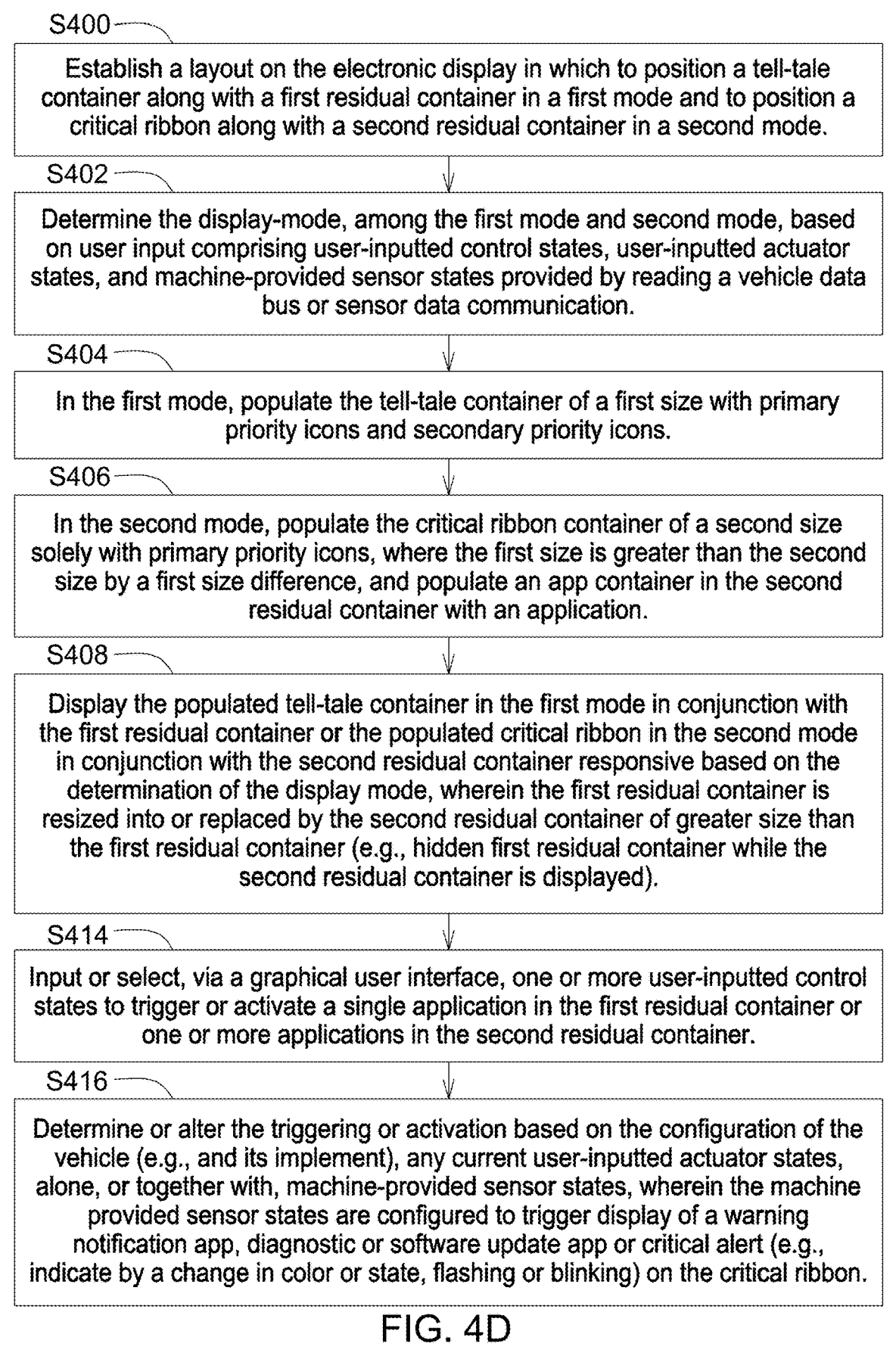

Establish a layout on the electronic display in which to position a tell-tale container along with a first residual container in a first mode and to position a critical ribbon along with a second residual container in a second mode.

S402

Determine the display-mode, among the first mode and second mode, based on user input comprising user-inputted control states, user-inputted actuator states, and machine-provided sensor states provided by reading a vehicle data bus or sensor data communication.

S404

In the first mode, populate the tell-tale container of a first size with primary priority icons and secondary priority icons.

S406

In the second mode, populate the critical ribbon container of a second size solely with primary priority icons, where the first size is greater than the second size by a first size difference, and populate an app container in the second residual container with an application.

S408

Display the populated tell-tale container in the first mode in conjunction with the first residual container or the populated critical ribbon in the second mode in conjunction with the second residual container responsive based on the determination of the display mode, wherein the first residual container is resized into or replaced by the second residual container of greater size than the first residual container (e.g., hidden first residual container while the second residual container is displayed).

S414

Input or select, via a graphical user interface, one or more user-inputted control states to trigger or activate a single application in the first residual container or one or more applications in the second residual container.

S416

Determine or alter the triggering or activation based on the configuration of the vehicle (e.g., and its implement), any current user-inputted actuator states, alone, or together with, machine-provided sensor states, wherein the machine provided sensor states are configured to trigger display of a warning notification app, diagnostic or software update app or critical alert (e.g., indicate by a change in color or state, flashing or blinking) on the critical ribbon.

FIG. 4D

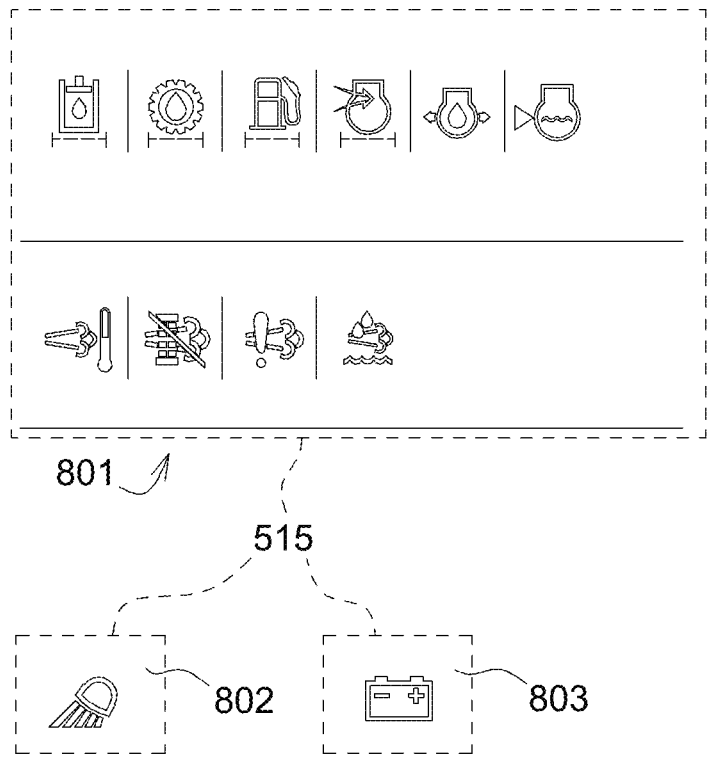
801
515
802                803
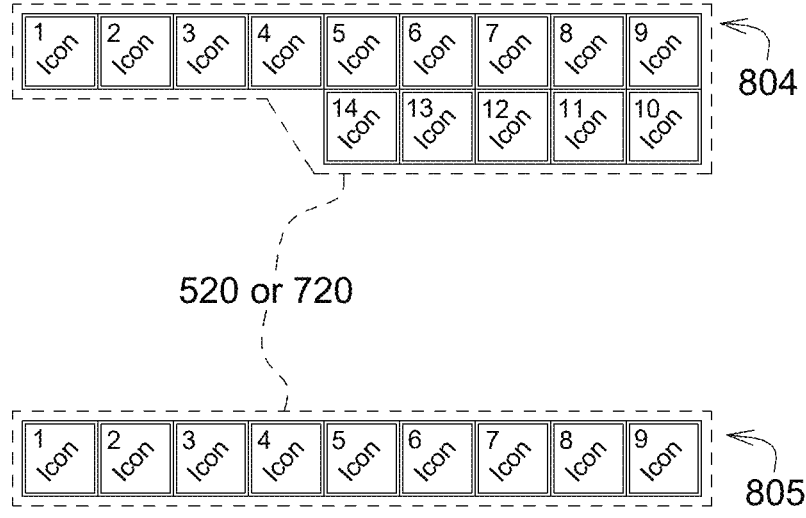
804
520 or 720
805
FIG. 13

METHOD FOR DISPLAYING GRAPHICAL DATA ON AN ELECTRONIC DISPLAY

RELATED APPLICATION

This document (including the drawings) claims priority and the benefit of the filing date based on U.S. provisional application No. 63/489,903, filed Mar. 13, 2023, and entitled METHOD FOR DISPLAYING GRAPHICAL DATA ON AN ELECTRONIC DISPLAY under 35 U.S.C. § 119(e), where the provisional application is hereby incorporated by reference herein.

FIELD

This disclosure relates to a method for displaying graphical data on an electronic display.

BACKGROUND

In some prior art, off-road vehicles, such as heavy equipment, agricultural vehicles, construction vehicles, road maintenance, resurfacing and repair equipment are configured with one or more electronic displays in a cab or cockpit to provide an operator with information about the vehicle, its implements, its or their systems, and its, or their components or modules. However, the one or more electronic displays of the vehicle have limited display area, which makes the displayed information vulnerable to omission or culling; hence, unavailable to the operator, among other possibilities. Accordingly, there is need for an improved method for efficiently presenting and displaying graphical data on an electronic display.

SUMMARY

In accordance with on embodiment, a method or system is configured to display graphical data on an electronic display. An electronic data processor or layout manager is configured to establish a layout, on the electronic display, in which to position: (a) a tell-tale container in a first mode, and (b) a first residual container, a critical ribbon, and a second residual container in a second mode. The electronic data processor or mode manager is configured to determine the display mode, among the first mode and the second mode, based on user input (e.g., which comprises user-inputted control states, user-inputted actuator states) and machine-provided sensor states (e.g., provided by reading a vehicle data bus or sensor data communication). In the first mode, the electronic data processor or icon manager is configured to populate the tell-tale container of a first size with primary priority icons and secondary priority icons. In the second mode, the electronic data processor or the icon manager is configured to populate the critical ribbon container of a second size solely with primary priority icons, where the first size is greater than the second size by a first size difference, and to populate an app container in the second residual container with an application. The electronic data processor or run screen manager is configured to display the populated tell-tale container in the first mode in conjunction with the first residual container, or the populated critical ribbon in the second mode in conjunction with the second residual container responsive based on the determination of the display mode, wherein the first residual container is resized into, or replaced by, the second residual container of greater size than the first residual information.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4A is a first embodiment of a flow chart for a method for displaying graphical data on an electronic display.

FIG. 4B is a second embodiment of a flow chart for a method for displaying graphical data on an electronic display.

FIG. 4C is a third embodiment of a flow chart for a method for displaying graphical data on an electronic display.

FIG. 4D is a fourth embodiment of a flow chart for a method for displaying graphical data on an electronic display.

FIG. 13 illustrates examples of a primary priority icons and secondary priority icons that can populate one or more respective tell-tale containers.

Like numbers in any set of two or more figures refer to like elements throughout the description of the figures.

DETAILED DESCRIPTION

Various example embodiments will now be described more fully with reference to the accompanying drawings in which some example embodiments are illustrated.

In the following description, illustrative embodiments will be described with reference to acts and symbolic representations of operations (e.g., in the form of flowcharts) that may be implemented as program modules or functional processes including routines, programs, objects, components, data structures, or the like, that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

The term implement may refer to a particular piece of equipment or function of the vehicle including a plow, tillage equipment, harvesting head, planter and sprayer.

Figure 1:
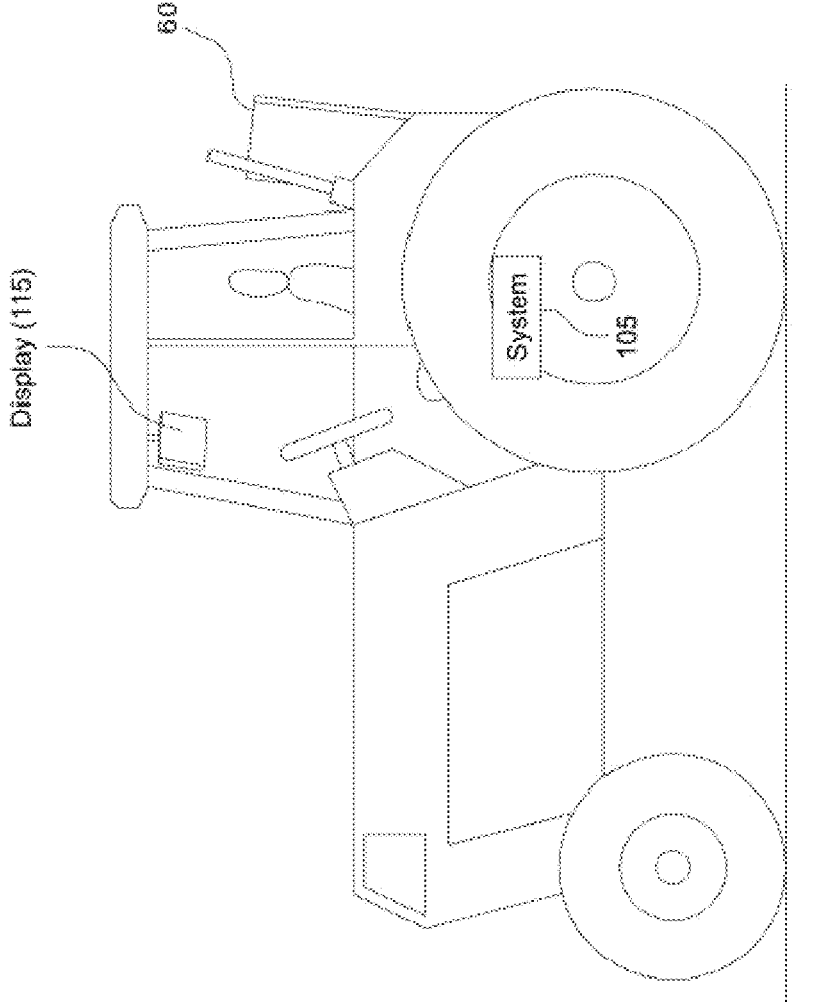
FIG. 1 illustrates a vehicle with an electronic display and associated electronic data processing system in a cab or cockpit.

FIG. 1 illustrates a vehicle 60, such as a machine, heavy-equipment, or off-road vehicle, in which at least one example embodiment is implemented. The vehicle 60 includes a display system 105 including an electronic display 115. The electronic display 115 may display any features or parameters of the off-road vehicle 60, including, for example, speed and heading information. The electronic display 115 may be used to enter user preference parameters described in further detail below. For example, the electronic display 115 may be used to establish a retracting shortcut bar, status shortcuts and edit run page sets.

Figure 2:
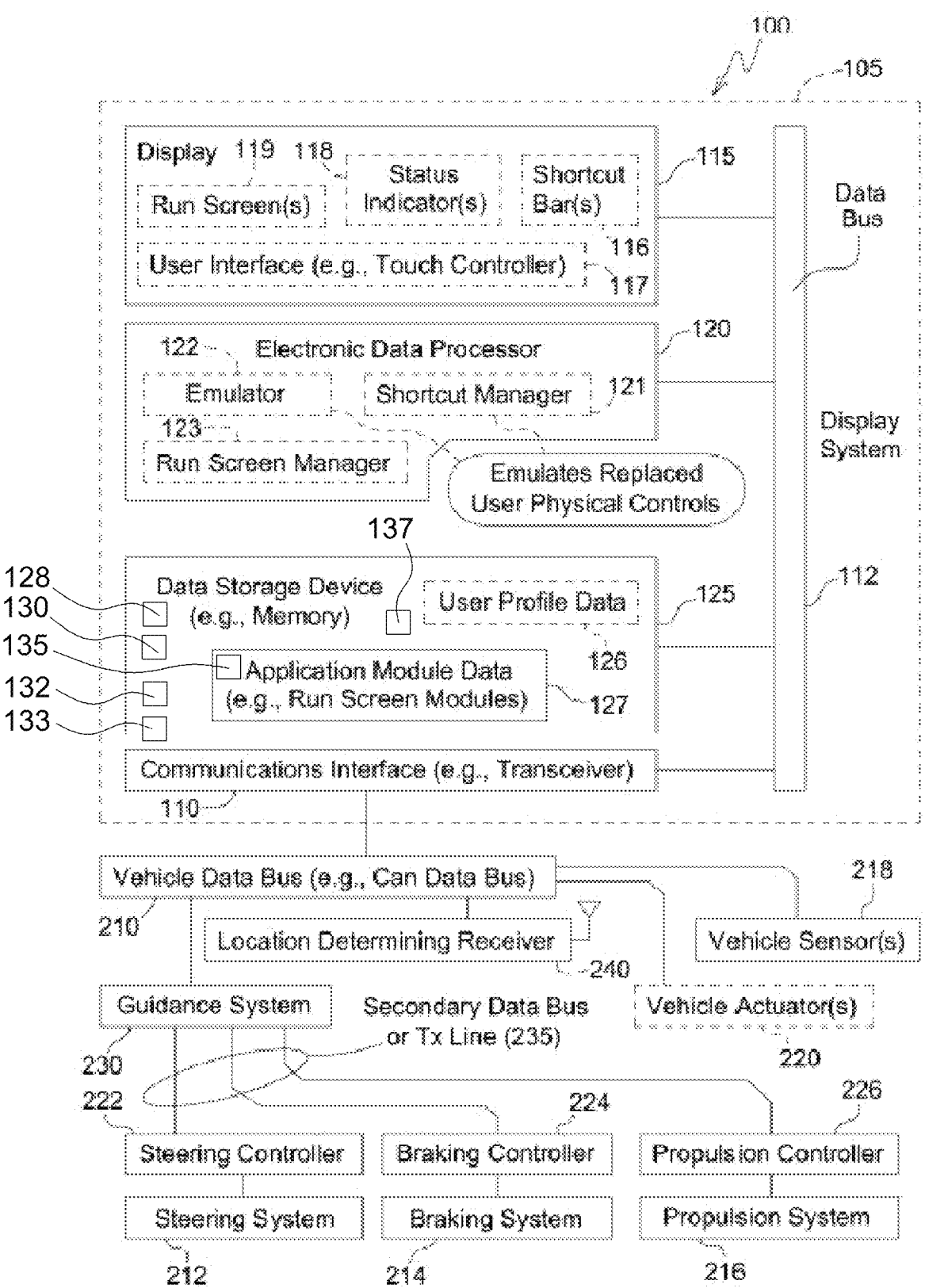
FIG. 2 is a block diagram of a vehicle system comprising an electronic display and an associated electronic data processing system.

Features of the electronic display system 105 are described in further detail with regard to FIG. 2. An electronic data processor 120 or layout manager is configured to establish a (screen) layout on the electronic display 115 in which to position a tell-tale container (e.g., 804 or 805) in a first mode. Further, in the display system 105 the electronic data processor 120 or layout manger is configured to establish a first residual container, a critical ribbon, and a second residual container in a second mode. The electronic data processor 120 or mode manager 137 is configured to determine the display mode, among the first mode and second mode, based on user input (e.g., which comprises user-inputted control states, user-inputted actuator states) and machine-provided sensor states (e.g., provided by reading a vehicle data bus or sensor data communication). In the first mode, the electronic data processor 120 or icon manager is configured to populate the tell-tale container (e.g., 804 or 805) of a first size with primary priority icons (e.g., 801) and secondary priority icons (e.g., 802, 803), as illustrated in FIG. 13. In the second mode, the electronic data processor 120 or the icon manager is configured to populate the critical ribbon container of a second size solely with primary priority icons (e.g., 801), where the first size is greater than the second size by a first size difference, and to populate an app container in the second residual container with an application.

The electronic data processor 120 or run screen manager 135 is configured to display the populated tell-tale container (e.g., 515) in the first mode in conjunction with the first residual container (e.g., 504) or the populated critical ribbon (e.g., 520, 720) in the second mode in conjunction with the second residual container (e.g., 518) responsive based on the determination of the display mode, wherein the first residual container (e.g., 504) is resized into, or replaced by, the second residual container (e.g., 518) of greater size than the first residual information. In certain embodiments, the tell-tale container (e.g., 515) may comprise primary priority icons (e.g., 801), secondary priority icons (e.g., 802, 803) or both. Meanwhile, the critical ribbon or critical ribbon container may comprise primary priority icons, or only primary priority icons.

In some embodiment, the tell-tale container 515 may be associated with the first mode, whereas the critical ribbon container or critical ribbon (520, 720) may be associated with the second mode, where the second mode, where the tell-tale container 151 may have a greater tell-tale spatial area available (e.g., two lines or one and a half lines) on the display than a lesser critical ribbon spatial area (e.g., one line or a half line). Informally or colloquially, the tell-container and the critical ribbon container (e.g., critical ribbon) can be referred to as analogous or somewhat equivalent features, while respecting or recognizing the above noted differences in formal and technical documents.

FIG. 2 illustrates a system 100 of a vehicle according to an example embodiment. The vehicle may be a work vehicle such as an off-road work vehicle, agricultural machine, forestry machine, construction machine or heavy equipment vehicle. However, example embodiments are not limited thereto and may be implemented in other types of vehicles.

The system 100 includes electronic modules, software modules, or both. In an example embodiment, the system 100 includes a display system 105 to support storing, processing or execution of software instructions of one or more software modules. The display system 105 is indicated by the dashed lines in FIG. 2. It should be understood that the system 100 may include other systems configured to support storing, processing or execution of software instructions of one or more software modules in the functioning of the machine. However, for the sake of brevity, they will not be described understanding that FIG. 2 is not limited just to the features shown in FIG. 2.

The lines that are interconnecting the aforementioned devices may be physical data paths, logical data paths, or both. Physical data paths are defined by transmission lines or data buses. Data buses may be, for example, Control Area Network (CAN) buses or ISO buses. Logical data paths may comprise logical or virtual communications that take place within software or between software modules.

The display system 105 is configured receive data regarding systems (e.g., steering system 212, braking system 214, propulsion system 216, vehicle sensor(s) 218), components and implements via a communications interface 110 in the display system 105 that accesses a vehicle data bus 210. The vehicle data bus 210 may be a controller area network (CAN) data bus, for example.

The communications interface 110 may receive and transmit messages containing further data to/from the vehicle data bus 210, where data can be communicated to/from the steering system 212, braking system 214, propulsion system 216, vehicle sensor(s) 218 or other controller of the vehicle connected on the data bus. The messages may be implemented using a protocol such as CAN. The messages may contain data including operational parameters or other parameters related to the vehicle provided by the sensors 218, for example, temperature gauges, magnetic wheel speed sensors, traction control sensors, etc.

Each of the steering system 212, braking system 214 and propulsion system 216 receives commands from and communicates data to a steering controller 222, braking controller 224 and propulsion controller 226, respectively.

The steering system 212 cooperatively operates with the steering controller 222 to control the steering of the vehicle. For example, if a user of the vehicle selects a certain track (route) or path plan to follow, the steering controller 222 receives commands from a guidance system 230 and controls the steering system 212 such that the vehicle follows the selected route or path plan. Moreover, the steering controller 222 may control the steering system 212 in a conventional manner when a user is manually driving. The steering system 212 may be an electrical steering system, a drive-by-wire steering system, an electrohydraulic steering system, or a hydraulic steering system with an electronic control interface, for example.

The vehicle data bus 210 provides signals to the steering controller 222 from the display system 105. For example, the vehicle data bus 210 may provide signals including CAN messages to the steering controller 222. The messages may include, for example, commands such as steering angle commands or position data.

The braking system 214 cooperatively operates with the braking controller 224 to control the braking of the vehicle. For example, if a user of the vehicle selects a certain track (route) to follow, braking controller 224 receives commands from the guidance system 230 and controls the braking system 214 to brake when the vehicle is approaching a turn. Moreover, the braking controller 224 may control the braking system 214 in a conventional manner when a user is manually driving.

The propulsion controller 226 cooperatively operates with the propulsion system 216 to control the propulsion of the vehicle. The propulsion may be any known motor or engine, for example. For example, if a user of the vehicle selects a certain track (route) to follow, propulsion controller 226 receives commands from the guidance system 230 and controls the propulsion system 216 to move the vehicle along the selected route. Moreover, the propulsion controller 226 may control the propulsion system 216 in a conventional manner when a user is manually driving.

As described above, the steering controller 222, braking controller 224 and propulsion controller 226 communicate with the guidance system 230. The steering controller 222, braking controller 224 and propulsion controller 226 may communicate with the guidance system 230 through a secondary data bus 235 or transmission line. The guidance system 230 provides information to the steering controller 222, braking controller 224 and propulsion controller 226 regarding location, heading, and route. Moreover, the guidance system 230 is connected to the vehicle data bus 210 and obtains data and commands regarding which location and route to follow, for example. The guidance system 230 may be a Global Positioning System (GPS) system, or another type of guidance system.

The guidance system 230 may automatically steer the vehicle in accordance with a path plan (e.g., linear path or contour) based on GPS position measurements or navigation system measurements provided by a location-determining receiver 240.

The location-determining receiver 240 is connected to the vehicle data bus 210, as well. The location-determining receiver 240 may be a GPS receiver, a Global Navigation Satellite System (GNSS) receiver, or a location-determining receiver (e.g., with a correction signal, such as a carrier phase differential correction signal), for example. In one embodiment, the location-determining receiver 240 transmits the location to the display system 105 and guidance system 230 through the vehicle data bus 210. The location-determining receiver 240 may provide one or more of the following data types: position data (e.g., expressed as geographic coordinates), velocity data, acceleration data, and attitude data (e.g., roll angle, pitch angle, and yaw angle). Velocity data further comprises speed data and heading data for the vehicle. The location-determining receiver 240 transmits the data to the display system 105 and guidance system 230 through the vehicle data bus 210. The aforementioned data may further be displayed on the electronic display 115 of the display system 105.

The vehicle may include various actuators 220. In one example, an actuator 220 may be used to provide rotational energy or linear movement of component of an implement. In another example, an electrical steering system or a drive-by-wire steering system may include an electric motor or actuator that is mechanically coupled to rotate or steer at least one wheel of the vehicle.

As described, the display system 105 transmits and receives data regarding the vehicle through the communications interface 110. The communications interface 110 is connected to a data bus 112. In addition to the communications interface 110, the electronic display 115 and the data bus 112, the display system 105 further includes an electronic data processor 120 and a data storage device 125.

The communications interface 110, the electronic display 115, the data bus 112, the electronic data processor 120 and the data storage device 125 are connected to the data bus 112 and are configured to communicate with each other through the data bus 112.

The electronic processor 120 implements algorithms, executes software instructions, and/or performs other logic or functionality of the display system 105 described in further detail below.

The electronic data processor 120 may be any type of processor configured to execute program codes such as those stored in the data storage device 125. In an example embodiment, the electronic processor 120 may include an electronic data processor, a digital signal processor, microprocessor, a microcontroller, a programmable logic array (PLA), field programmable gate array (FPGA), a system on a chip (SOC), a logic circuit, an arithmetic logic unit, an application specific integrated circuit (ASIC), a digital signal processor (DSP), system on a chip, a proportional-integral-derivative (PID) controller, or another data processing device.

The data storage device 125 may include any magnetic, electronic, or optical device for storing data. For example, the data storage device 125 may include an electronic data storage device, an electronic memory, non-volatile electronic random access memory, one or more electronic data registers, data latches, a magnetic disc drive, a hard disc drive, an optical disc drive, or the like. The electronic data processor 120 outputs results of algorithms and other functionality of the display system 105 to the data bus 112.

The data storage device 125 may store user profile data 126, the application module 127 (e.g., application data manager or run screen modules), a layout manager 128, a container manager 130, an icon manager 133, and an app-pairing manager 132. In some embodiments, the app-pairing manager 132 comprises an app-coordinating manager or app-sharing manager for coordinating simultaneous display, loading and operation of multiple applications on a single screen for the convenience of the operator in managing the vehicle or its implements in an ergonomic and efficient manner. In one embodiment, the application module data 127, a layout manager 128, a container manager 130, an icon manager 133, and an app-pairing manager 132 each comprise a module (e.g., software module), such as software instructions, software components, or software libraries that can be executed by the electronic data processor 120.

The layout manager 128 is configured to establish the layout of one or more screens, such one or more of the following: each position, boundary, orientation, order, sequence, region or zone, shape, and/or size of a corresponding container on the graphical user interface of the electronic display 105 and each position, boundary, orientation, order, sequence, region or zone, shape, and/or size of a corresponding icon on the graphical user interface of the electronic display 105.

The container manager 130 may define the region, zone, size, shape and boundary of a container for display on the user interface of the electronic display 105, along with one or more placeholders, seats or spatial pixel zones on the grid of the display for inserting or displaying one or more primary priority icons, secondary priority icons or other icons on the electronic display 105.

The icon manager 133 defines the possible or assigned position, order, or sequence and state of the icons that are inserted into container on the electronic display 105 based on any of the following: the machine profile (e.g., vehicle, machine configuration or machine specifications of the vehicle 60, and its implement, which are stored in the data storage device 125, and observed sensor data from sensors (e.g., read from the vehicle data bus or controller area network (CAN) data bus, or Ethernet data bus), observed actuator data from actuators e.g., read from the vehicle data bus or controller area network (CAN) data bus, or Ethernet data bus), end user inputs or selections into the user interface 117 of the electronic display 105.

The app-pairing manager 132 is configured to select, assign, pair, organize, structure or group two or more related applications into a set of paired applications, such as a first application and a second application, which can be displayed simultaneously on the same electronic display 105 or in the second residual container during the second mode. Alternately, the app-pairing manager is configured to select, assign, pair, organize, structure or group two or more related applications into a set of paired applications, such as a first application and a second application, where the first application can be displayed simultaneously with a second shortcut (icon) for the respective second application on the same electronic display 105 or in the second residual container during the second mode; or where the second application can be displayed simultaneously with a first shortcut (icon) for the respective first application on the same display or in the second residual container during the second mode.

The user profile data 126 may include data representing a skill level of the user and authorization level of the user. For example, the skill level may be beginner, intermediate and advanced. The application module 127, which is one or more run screen modules, application data management modules, or other software modules that are dedicated or programmed to perform, monitor and/or control a certain work task (e.g., planting, seeding, spraying, harvesting, leveling, grading, drilling, tilling) of the work vehicle, includes data for the electronic display 105, or its electronic display 115, to display run screens and organize run screens according to sets, such as related pairs of applications for convenient and efficient simultaneous viewing on the same screen of the electronic display 115, as will be described in further detail below.

In one embodiment, the electronic data processor 120 includes a shortcut manager 121, emulator 122 and run screen manager (123, 135). In some configurations, the run screen manager 123 is storable or loadable in the electronic memory or registers of the electronic data processor 120 for execution by the electronic data processor 120 and the run screen manager 135 can be stored in the data storage device 125 for execution by the electronic data processor 120. The shortcut manager 121 manages the shortcut abilities of the display screen of the electronic display 115 such as the shortcut bar 116. The emulator 122 emulates buttons or virtual switches on the display screen of the electronic display 115 (e.g., touch display screen) that were conventionally represented by physical controls. With the shortcut manager 121, the emulator 122 emulates replaced user physical controls. The run screen manager (123, 135) retrieves run screens and sets of run screens based on an action of the user. Moreover, the run screen manager (123, 135) organizes the run screen modules into sets. The sets of run screen modules may be dictated by a user's selection and/or programmed by a manufacturer of the display system 105.

In some configurations, the display screen of the electronic display 115 may be a touch screen display with a user interface 117. The user interface 117 may act as a touch controller. The user interface 117 may communicate the actions of the user (e.g., touch) to the processor 120 through the data bus 112. While actions by the user are often described as touching, it should be understood that the user interface 117 may operate based on voice commands, pointing devices (e.g., electronic mouse), and/or other objects (e.g., stylus) touching the display. Moreover, other possible gestures include double tap, drag/slide, flick, nudge, pinch and spread. In certain embodiments, the display screen 115 displays the shortcut bar, status indicator 118 and run screen 119, as is illustrated in one or more drawings, where FIG. 5 through FIG. 20, inclusive, are representative of possible screen configurations of the graphical user interface.

The terms run pages, run screens and dashboards may be used interchangeably.

At least one example embodiment discloses an edit run page set overlay, which can be defined by the layout manager 128. The edit run page set overlay may include design components for editing a current run page set. The edit run page set overlay gives the user the ability to change the name of the current run page set and to add, remove, and reorder pages within the run page set.

A run screen provides a dedicated functionality or set of functions for a machine, such as planting, tilling, harvesting, spraying or another agricultural or other work task. Further, the run screen may provide diagnostics, or status messages on different components, systems, or the vehicle, or its implements (attached or operable connected to the vehicle). An application or application program may be configured to support one or more respective run screens, where an application may comprise a first application, a second application or another application. An application may represent a computer program that performs any specific useful functions (e.g., controlling, monitoring, measuring, observing, guiding, navigating, determining diagnostics, managing telematics data, or otherwise processing or manipulating data) related to a vehicle, machine, or any actuator, sensor, controller, component, implement, or system of the vehicle or machine.

Run screens are customizable with modular content for the display of vehicle status and control information. Run screens have custom user-programmable controls (e.g., guidance control) for vehicle components, systems or features that previously required separate physical controls (e.g., joystick, dials, levers, knobs or switches). Advantageously, the vehicle manufacturer does not need to provide physical controls for less popular or seldom ordered options on vehicles (e.g., front power take-off shaft on a tractor) because the display system can be customized to produce data messages that emulate such physical controls in communication with the vehicle data bus 210 (e.g., CAN data bus, Ethernet data bus, and/or ISO data bus).

Via the user interface or otherwise, the user may configure or reconfigure the layout of the electronic display vehicle to only have controls (icon buttons on the toolbar) that are relevant to a task at hand and the particular version of the vehicle, for a particular user, or for a particular season (e.g., harvesting buttons may be temporarily deleted for Spring planting, Fall Run screens can be optimized for harvesting, planting winter wheat or tillage; Spring Run Screens can be adjusted for tillage, fertilizing or planting; Summer Run Screens can be optimized for spraying).

Figure 3:
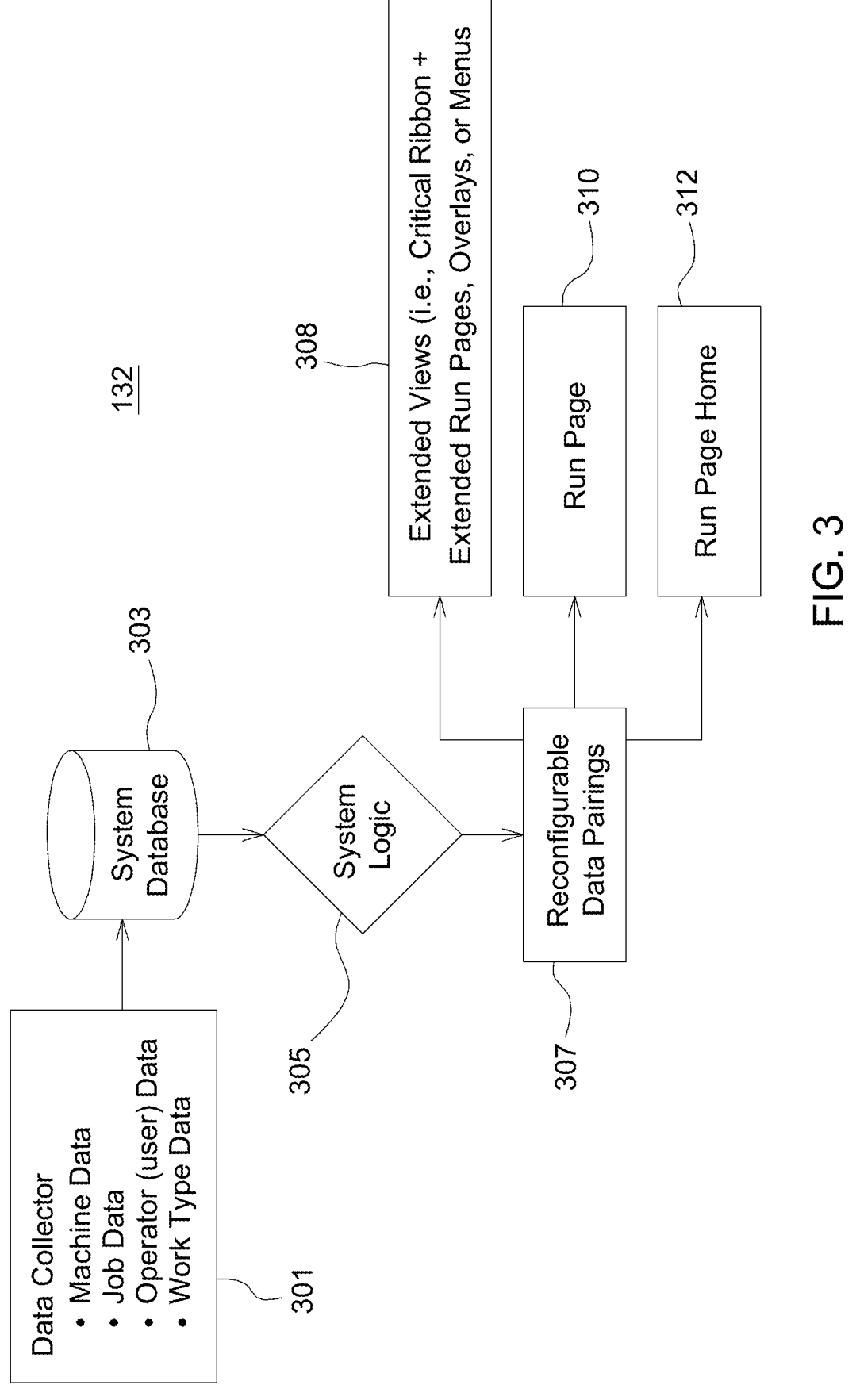
FIG. 3 is a block diagram of a data pairing module for organizing or structuring run screen data of one or more run screens to be displayed on the electronic user interface.

FIG. 3 illustrates one embodiment of block diagram of the app-pairing manager 132, which is a module (e.g., software module) configured: (a) to pair related applications (e.g., first application and second application) for display simultaneously within the second residual container in the second mode, or (b) to pair a related applications for display of one of the applications, together with a shortcut (icon) to link or switch to the other application for display on the electronic display. The app-pairing manager 132 comprises a system data base 303 (e.g., relational data base), system logic 305, and reconfigurable data-pairing module 307.

In FIG. 3, a data collector 301 may comprise the application module 127, run screen manager 135, and/or communications interface 110, where the data collector is configured to collect input data for reading, writing, indexing, searching, storage and retrieval in the system database 303. The system database 303 comprises one or more of the following the following input data: machine data (e.g., machine profile, machine specifications, vehicle type, implement type, implement profile, implement specifications, configuration), job or work task data, and operator user data (e.g., operator profile).

The system data base 303 comprises input data, such as files, inverted files, records, or other data structures that can be archived, stored, accessed, queried retrieved or read by the electronic data processor 120. The input data of the data collector 301 may be stored in the data storage device 125. In an alternate embodiment, the input data of the data collector 301 may be stored in a cloud data storage device or a central server coupled to the communications network (e.g., Internet) accessible by a wireless communications device, where the wireless communications device is coupled to the data bus 112 or to the communications interface 110 (e.g., transceiver).

The system database 303 is coupled to system logic 305, which in practice comprises one or more software modules (e.g., 127, 132, 135) stored in the data storage device 125, where the system logic 305 can be executed by the electronic data processor 120. The electronic data processor 120 is configured to execute the system logic 305 or app-pairing manager 132 to facilitate reconfigurable and complimentary data pairings by grouping key sub-system information and displaying combinations of those pairings on the user interface to generate multiple work views, such as one or more of the following: (a) extended view data 308 that comprises the critical ribbon container plus an (extended) run page displayed in the first residual container of the graphical user interface or a pair of (extended) run pages displayed in the second residual container of the graphical user interface, (b) any overlays, menus or one or more additional containers associated with one or more corresponding run pages or screens, (c) run page data 310 (e.g., consistent with one or more illustrative examples in FIG. 5 through FIG. 20, inclusive), and/or (d) run page home data 312 (e.g., consistent with the illustrative examples in FIG. 18 and FIG. 19.)

In extended view data 308, the layout manager or the electronic data processor 120 is configured to alter the layout of the display to create a larger viewable area in a second mode than in a first mode, where the larger viewable area or second residual container may be referred to as an extended view. As specifically noted herein, this document and the accompanying drawings provide some examples of displaying screens in the first mode and the second mode.

FIG. 4A illustrates a first embodiment of a method for displaying graphical data on a graphical user interface 117. The method of FIG. 4A begins in step S400.

In step S400, an electronic data processor 120 or layout manager 128 is configured to establish a layout on the electronic display 115 in which to position: (a) a tell-tale container 515 and a first residual container 504 in a first mode, and (b) a critical ribbon 520 and a second residual container 518 in a second mode.

In one configuration, the electronic display 115, or its pixels, may be associated with coordinates of a grid, where row pixels align with a row or horizontal axis of the gid of the electronic display 115 and column pixels align with a column or vertical axis of the grid of the electronic display 115. In one embodiment, the layout describes or defines where each container, icon or display feature is aligned or positioned (e.g., on the grid of the display) in a first mode, a second mode, or any other mode.

A container may be defined by a zone or region of pixels of the display, such as a rectangular region with a vertical dimension along the vertical axis of the display and a horizontal axis along the horizontal display. For example, a tell-tale container 515 may be configured to hold (or as a placeholder) for one or more rows of icons, or a first row (e.g., upper row) of X icons, and a second row (e.g., lower row at least partially adjoining the upper row) of Y icons, where X and Y are positive whole numbers or positive integers and where X is equal to Y, or where X is greater than Y. A container may be classified or tell-tale container 515, a critical ribbon 520 (e.g., critical ribbon container), a first residual container 504, a second residual container (518, 718) an application container, a first application, 512, 712, (e.g., first application container), a second application, 514, 714, container, or a shortcut (e.g., application shortcut icon 508 or shortcut camera icon can populate a shortcut).

Step S400 may be executed in accordance with various techniques, which may be applied separately or cumulatively. For any of the various techniques, the electronic data processor 120 can execute software instructions in one or more software modules (126, 127, 128, 130, 132, 133, 135, 137) or other modules that are stored in the data storage device 125, where the software modules may include software, programs, subroutines, libraries, data, configuration data, definitions, classes, objects, interfaces, or the like.

Under a first technique, in the first mode, the tell-tale container 515 is associated with a visual gauge module 506 having a third size with visual representations of gauges and respective gauge levels for primary priority icons, wherein the third size is greater than the size of the critical ribbon 520 by a second size difference and wherein the visual gauge module 506 resides in the first residual container 504.

Under a second technique, in the second mode in the second residual container 518, the electronic data processor 120, the layout manager 128, or container manager 130 is configured to hide the visual representation of the gauges (e.g., visual gauge module 506) and to indicate a threshold level (e.g., low level, high level, or acceptable level or suitable range for operation of the vehicle) or alarm level or status of a respective gauge by any of the following: (a) corresponding color of the icon or change in the color of the icon that represents the respective gauge (e.g., hidden gauge, hidden gauge module, or gauge omitted or deleted from the screen, container, or layout); (b) blinking of the icon that represents the respective gauge (e.g., hidden gauge, hidden gauge module, or gauge omitted or deleted from the screen, container, or layout); (c) intensity or flashing of the icon that represents the respective gauge (e.g., hidden gauge, hidden gauge module, or gauge omitted or deleted from the screen, container, or layout); and/or (d) audible alarm that represents the respective gauge (e.g., hidden gauge, hidden gauge module, or gauge omitted or deleted from the screen, container, or layout).

Under a third technique, in the second mode in the second residual container 518, the electronic data processor 120, the layout manager 128, or container manager 130 is configured to allocate the second size difference and third size difference to be available for the second residual container (518, 718 (to display one or more applications, while simultaneously displaying the critical ribbon (520, 720) comprising at least four icons among one or more of the following: automatic blade control active, automatic blade control inactive, winch speed, stop or shut-down vehicle, service or maintenance required, service or diagnostic information available, operator seat belt alert, oil filter restriction alert, fuel pressure alert, fuel level, air filter restriction, engine oil pressure alert, engine (oil) temperature alert, transmission temperature alert, transmission fluid temperature alert, coolant temperature alert, coolant low or loss alert, exhaust temperature alert, diesel exhaust fluid alert, emission system fault or alert, emissions filter cleaning disabled, battery state, battery discharged, power-take-off state (e.g., active, inactive, or revolutions per minute), and parking brake alert.

Under a fourth technique, the electronic data processor 120, the layout manager 128, the container manager 130 or the icon manager 133 is configured to structure the tell-tale container 515 to incorporate a critical ribbon (520, 720) (e.g., critical ribbon container) in a first mode along with a first residual container 504 (outside of the tell-tale container 515) and wherein the first residual container 504 houses a single application (e.g., first application 504, such as an implement control or grade control application) or run page configuration associated with a function or task of the vehicle.

Under a fifth technique, the electronic data processor 120 is configured to structure or organize each container, among the tell-tale container 515, the critical ribbon (520, 720) (e.g., critical ribbon container), the first residual container 504 and the second residual container (518, 718), to be associated with possible positions, zones, size, and states of containers, in respective modes of layout, wherein the states of the containers comprise any of the following: hidden, expanded, compact, background color.

In step S402, the electronic data processor 120 or mode manager is configured to determine the display mode, among the first mode and second mode, based on user input via user interface 117. For example, the user input or selection, which is entered into the user interface 117, may comprise: user-inputted control states, user-inputted actuator states, and machine-provided sensor 218 states (e.g., provided by reading a vehicle data bus 210, or data communications with vehicle sensors 218 in accordance with user-specified or factory-specified configurations).

In step S404 in the first mode, the electronic data processor 120 or icon manager 133 is configured to populate the tell-tale container 515 of a first size with primary priority icons 801 and secondary priority icons (802, 803).

In step S406 in the second mode, the electronic data processor 120 or the icon manager 133 is configured to populate the critical ribbon (520, 720) container of a second size solely with primary priority icons 801, where the first size is greater than the second size by a first size difference, and to populate an app container in the second residual container 518 with an application (e.g., first application (512, 712), second application (514, 714) or both).

In step S408, the electronic data processor 120 or run screen manager (123, 135) is configured to display the populated tell-tale container 515 in the first mode in conjunction with the first residual container 504 or the populated critical ribbon (520, 720) in the second mode in conjunction with the second residual container (518, 718) responsive based on the determination of the display mode, wherein the first residual container 504 is resized into, or replaced by, the second residual container (518, 718) of greater size than the first residual container 504 or its first residual information. In any embodiment disclosed herein, a visualization module is configured to render a visual representation of the containers, icon, or both on a graphical user interface 117.

FIG. 4B illustrates a second embodiment of a method for displaying graphical data on a graphical user interface 117. The method of FIG. 4B is similar to the method of FIG. 4A, except the method of FIG. 4B further includes step S410. Like reference numbers in FIG. 4A and FIG. 4B indicate like steps, procedures or features.

In step S410, in the second mode the layout manager 128, container manager 130, the app-pairing manager 132, the icon manager 133, or electronic data processor 120 is configured to populate the second residual container (518, 718) with a paired group of related applications (e.g., first application (512, 712) or second application (514, 714), or both) based on related machine functions (e.g., which are factory defined or end-user/operator defined), such that the paired group of related applications are displayed simultaneously in the second residual container (518, 718) of the second mode.

The method of FIG. 4B may be executed in accordance with various techniques, which may be applied separately or cumulatively. For any of the various techniques, the electronic data processor 120 can execute software instructions in one or more software modules (126, 127, 128, 130, 132, 133, 135, 137) or other modules that are stored in the data storage device 125, where the software modules may include software, programs, subroutines, libraries, data, configuration data, definitions, classes, objects, interfaces, or the like.

Under a first technique, in the second mode the layout manager 128, container manager 130, the app-pairing manager 132, the icon manager 133, or electronic data processor 120 is configured to populate the second residual container (518, 718) with a paired group of related applications (e.g., first application (512, 712) or second application (514, 714), or both) based on related machine functions that are factory-defined, such that the paired group of related applications are displayed simultaneously in the second residual container (518, 718) of the second mode.

Under a second technique, in the second mode the app-pairing manager 132, the icon manager 133, the layout manager 128, the container manager 130, or electronic data processor 120 is configured to form, define, select, or organize the paired group of related applications to comprise the motor grader control app module and an outside-facing camera app module (of a blade or work area of the motor grader). The camera application may provide a series of still images, a video or video stream of one or more imaging devices or cameras, such as digital charged coupled devices (CCD) in the humanly visible light spectrum, in the ultraviolet light spectrum, in the infrared light spectrum, and/or in the near infra-red light spectrum, where the images may comprise monocular or stereo images.

Under a third technique, in the second mode the app-pairing manager 132, icon manager 133, the layout manager 128, the container manager 130, or electronic data processor 120 is configured to form, define, select, or organize the paired group of related applications (e.g., first application (512, 712) or second application (514, 714) or both) comprise the hitch app control module (e.g., rear hitch) and hydraulic control value app module (e.g., selective control valve or electrohydraulic valve to control lift/lower and dump/curl function of equipment/implement).

FIG. 4C illustrates a method for displaying graphical data on a graphical user interface 117. The method of FIG. 4C is similar to the method of FIG. 4A, except the method of FIG. 4C further includes step S412. Like reference numbers in FIG. 4A and FIG. 4C indicate like steps, procedures or features.

In step S412 in the second mode, the icon manager 133 or electronic data processor 120 is configured to populate the second residual container (518, 718) with a paired group of related applications based on related machine functions (e.g., which are factory-defined or end-user-defined via user interface 117), such that an initial one (e.g., first application (512, 712), or second application (514, 714) of the paired group of related applications (e.g., first application (512, 712) and second application (514, 714) are displayed simultaneously with an application shortcut icon (508, 708) to the other one of the paired group of related applications in the second residual container 518 of the second mode. Further, via the user interface 117 or touchscreen system of the electronic display 115 the application shortcut icon (508, 708) can be selected, activated or triggered to switch instantly to the other one of the paired group of related applications in the second residual container 518 that is active on the display, while the initial one is hidden on the display.

The method of FIG. 4B may be executed in accordance with various techniques, which may be applied separately or cumulatively. For any of the various techniques, the electronic data processor 120 can execute software instructions in one or more software modules (126, 127, 128, 130, 132, 133, 135, 137) or other modules that are stored in the data storage device 125, where the software modules may include software, programs, subroutines, libraries, data, configuration data, definitions, classes, objects, interfaces, or the like.

Under a first technique, in the second mode the icon manager 133, the app-pairing manager 132, layout manager 128, the container manager 130, or electronic data processor 120 is configured to form, define, select or organize the paired group of related applications (e.g., first application (512, 712); second application (514, 714); or both) that comprise the motor grader control app module and an outside-facing camera app module (of a blade or work area of the motor grader).

Under a second technique, in the second mode the icon manager 133, the app-pairing manager 132, the layout manager 128, the container manager 130, or electronic data processor 120 is configured to form, define, select or organize the paired group of related applications (e.g., first application 512, second application 514, or both) that comprise the hitch app control module (e.g., rear hitch) and hydraulic control value app module (e.g., selective control valve or electrohydraulic valve to control lift/lower and dump/curl function of equipment/implement).

FIG. 4D illustrates a method for displaying graphical data on a graphical user interface 117. The method of FIG. 4D is similar to the method of FIG. 4A, except the method of FIG.

4D further includes step S414 and S416. Like reference numbers in FIG. 4A and FIG. 4D indicate like steps, procedures or features.

In step S414, the graphical user interface 117 comprises an electronic display 115, a touch screen, a keypad, a keyboard, an electronic pointing device (e.g., electronic mouse), or one or more electric inputs, joysticks, rotary encoders or other devices to support an end user's or operator's input, request or selecting of one or more user-inputted control states to trigger, select, or activate a single application (e.g., first application (512, 712) or second application (514, 714)) in the first residual container 504 or one or more applications in the second residual container 518.

In step S416, the electronic data processor 120, the layout manager 128, the container manager, or the icon manager 133 is configured to determine or alter the triggering or activation based on the configuration of the vehicle and its implement, any current user-inputted actuator states, alone, or together with, machine-provided sensor states (e.g., of one or more sensors 218), wherein the machine provided sensor states are configured to: (a) to trigger, select or activate the display of a warning notification app, diagnostic or software update app or critical alert (e.g., indicate by a change in color or state, flashing or blinking) on the critical ribbon (520, 720); and/or (b) temporarily interrupt the display of the signal application inputted, selected or requested via the user interface 117 or control switch.

Figure 5:
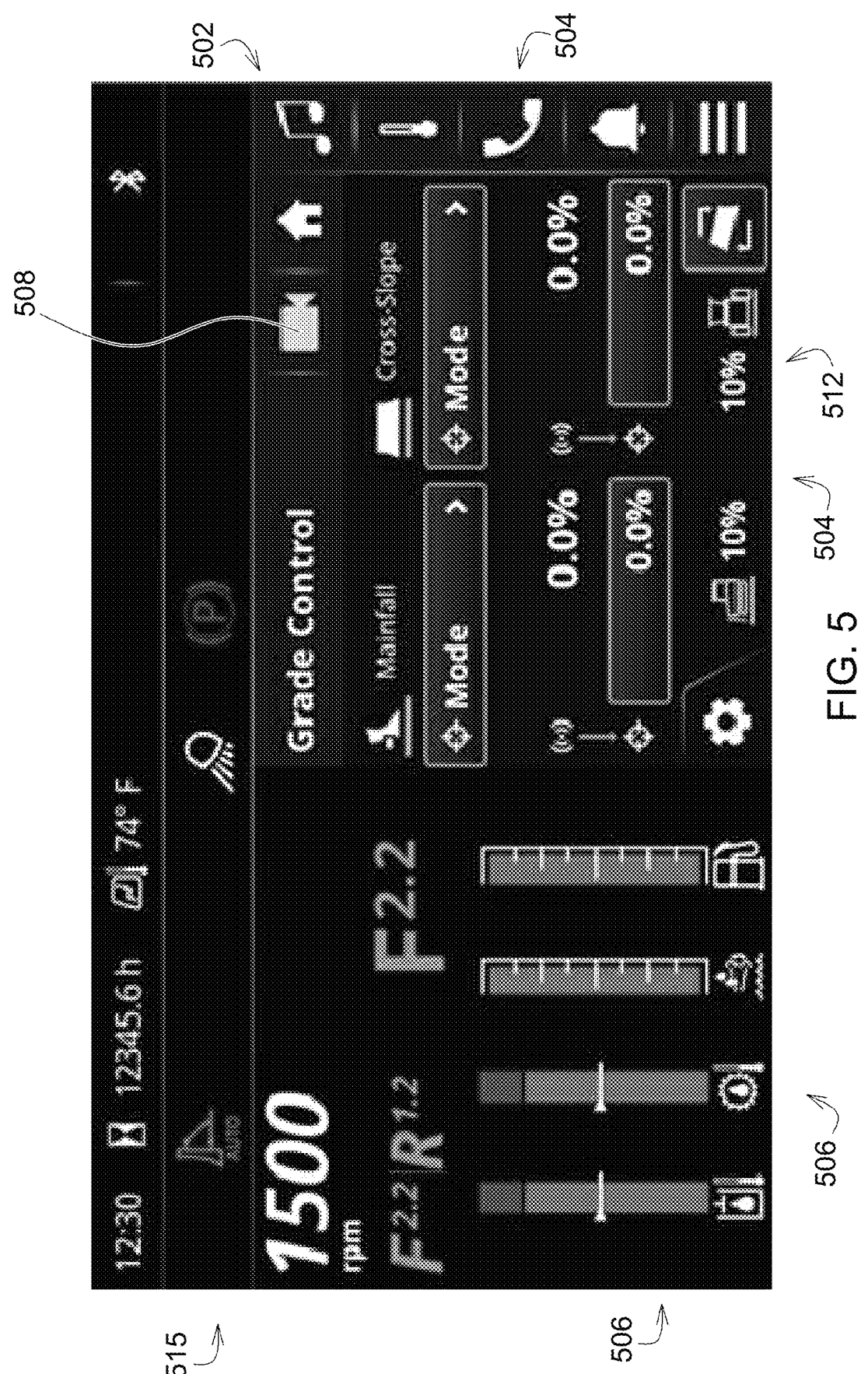
FIG. 5 illustrates a first embodiment of a run screen that can be displayed by an electronic device that displays a visual gauge module.

FIG. 5 illustrates a first run page 502 (e.g., first run page for grade control or limited run page) that is operating in the first mode with a first residual container 504, a visual gauge module 506, and a tell-tail container 515. Further, the first residual container 504 is configured to display a first application 512, such as grade control. The visual gauge module 506 provides expanded, detailed status information on the priority icons (801, 802, 803) that normally populate the tell-tale container 515, such as oil pressure level, oil or engine temperature level, coolant system level, and fuel level. The tell-tail container 515 provides secondary priority icons (802, 803), such as automatic grade control (e.g., active state, inactive state, or standby state/ready state), headlights/exterior lights, and parking brake.

In FIG. 5, via the user interface 117, the operator is able to switch to a second mode that illustrates a second run page (e.g., second run page for grade control or extended run page) within a second residual container 518. Here, in FIG. 5 the operator switches to the second mode with the second run page by pressing the application shortcut icon 508 (e.g., camera application shortcut icon), which transitions to the screen of FIG. 6, in which the app-pairing module 132 is configured to pair and display the first (control) application 512 (e.g., grade control application) and the second application 514 (e.g., camera application) simultaneously in the second residual container 518 in the second mode. The second residual container 518 of FIG. 6 occupies a greater spatial area of the display than the first residual container 504 of FIG. 5.

Figure 6:
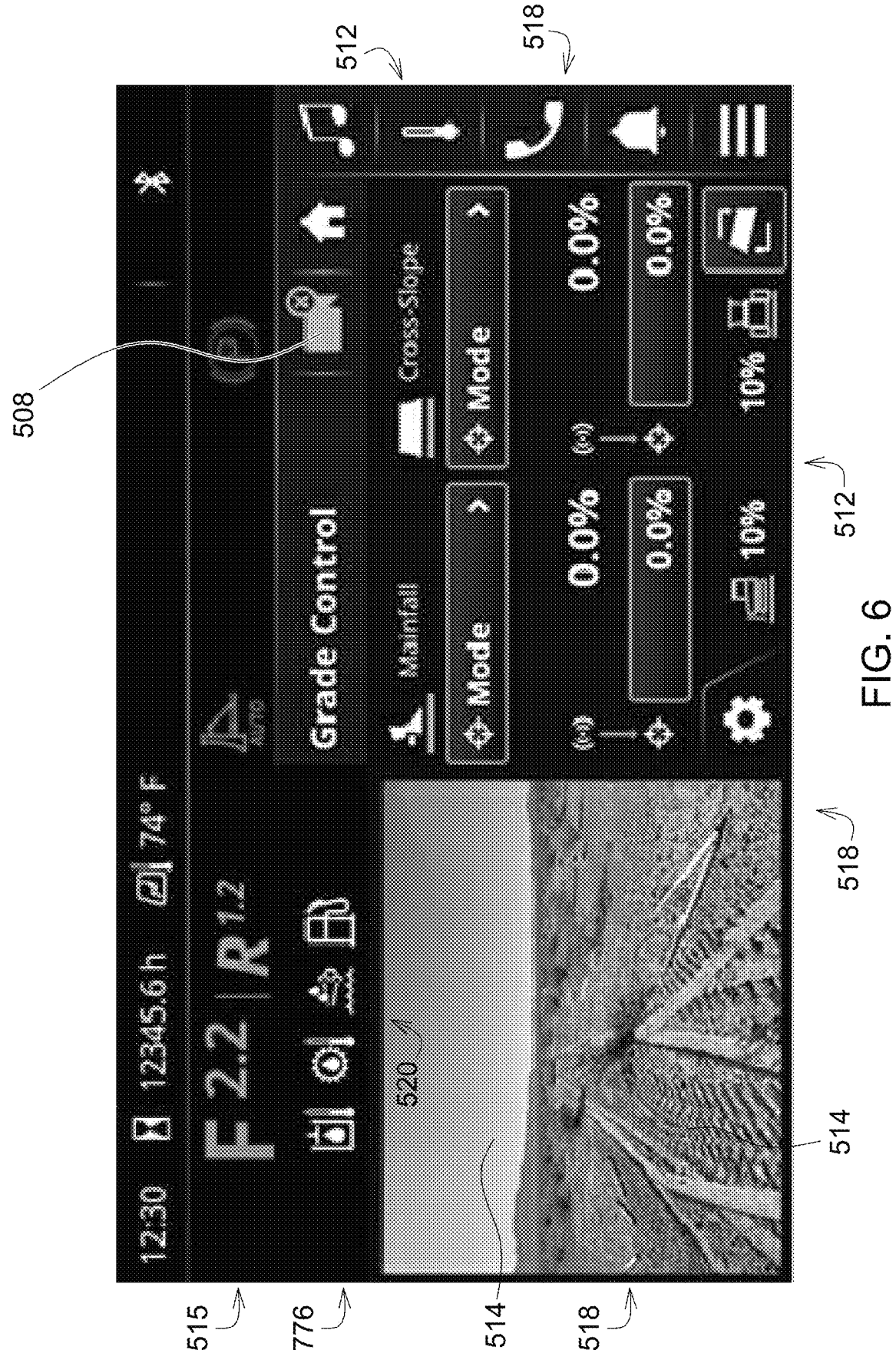
FIG. 6 illustrates a second embodiment of a run screen that can be displayed by an electronic device that displays an extended view of critical ribbon (container) plus extended run page components, such as exterior vehicle image and machine control settings (e.g., grade control settings).

In the second mode of FIG. 6, the critical ribbon 520 (e.g., critical ribbon container) is populated by primary priority icons (e.g., 801) that are visible by the operator on the same screen that the first application 512 (e.g., grade control application) and the second application 514 (e.g., camera application or camera-related application) are also visible for efficient, practical and ergonomic presentation of data that is convenient for the operator of the vehicle (e.g., and grade controlled implement, such as the orientation of a blade of a motor grader or other construction equipment), while reducing the amount of interaction (e.g., number of clicks, pressed or touches) with the display that is necessary to get data for the paired applications and the critical status data for the vehicle. In other words, FIG. 6 displays an extended view of critical ribbon 520 (e.g., critical ribbon container) plus extended run pages (512, 514) paired with run pages in a second mode. The first application 512 and the second application 514 are displayed simultaneously on the screen in the second residual container 518. The critical ribbon 520 (e.g., critical ribbon container) in FIG. 6 incorporates the same primary priority icons (e.g., 801) that populate the visual gauge module 506 in FIG. 5. Meanwhile, the tell tale container 515 incorporates secondary priority icons (e.g., 802, 803), or both the primary icons of the critical ribbon 520 and the secondary priority icons. The primary icons of the critical ribbon 520 are illustrated in a normal state 776 (e.g., white color, as opposed to a warning in yellow or red).

Alternately or cumulatively, overlays/menus of the display 115 are provided in the second mode outside of the second residual container 518 with the two paired run pages (e.g., applications 512, 514). The electronic data processor 120 is configured to execute software instructions of the app-pairing manager 132, icon manager 133, application module 127, or system logic 305; the electronic data processor 120 or system logic 305 is configured to output any of the following: a single run page, an extended run pages (e.g., paired or dual run pages, 512, 514), or both, where the run pages and data pairings are reconfigurable based on user profile data 126 or other input from the user interface 117. Further, complementary data pairings can generate multiple work views for the operator (user) to facilitate: (a) potentially increased productivity of the machine or vehicle that is associated with the electronic display 115, and/or potentially increase productivity of the machine or vehicle for work tasks that are managed within the simultaneously displayed first application 512 and second application 514.

Figure 7:
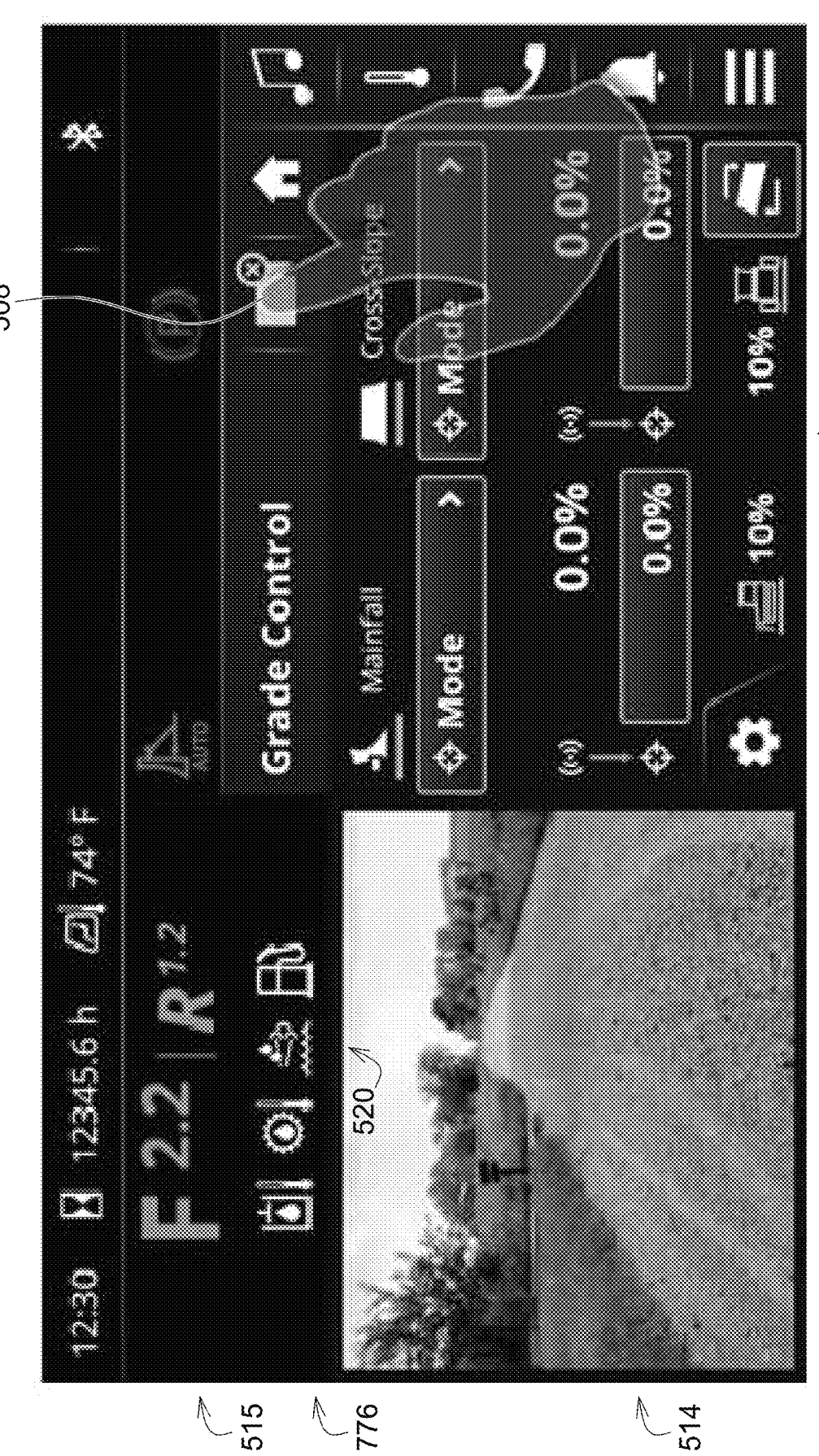
FIG. 7 illustrates a third embodiment of a run screen that can be displayed by an electronic device that displays an extended view of critical ribbon (container) plus extended run page components, such as exterior vehicle image and machine control settings (e.g., grade control settings), where the user pressing the camera shortcut icon to switch off the exterior vehicle image on the run screen.
Figure 8:
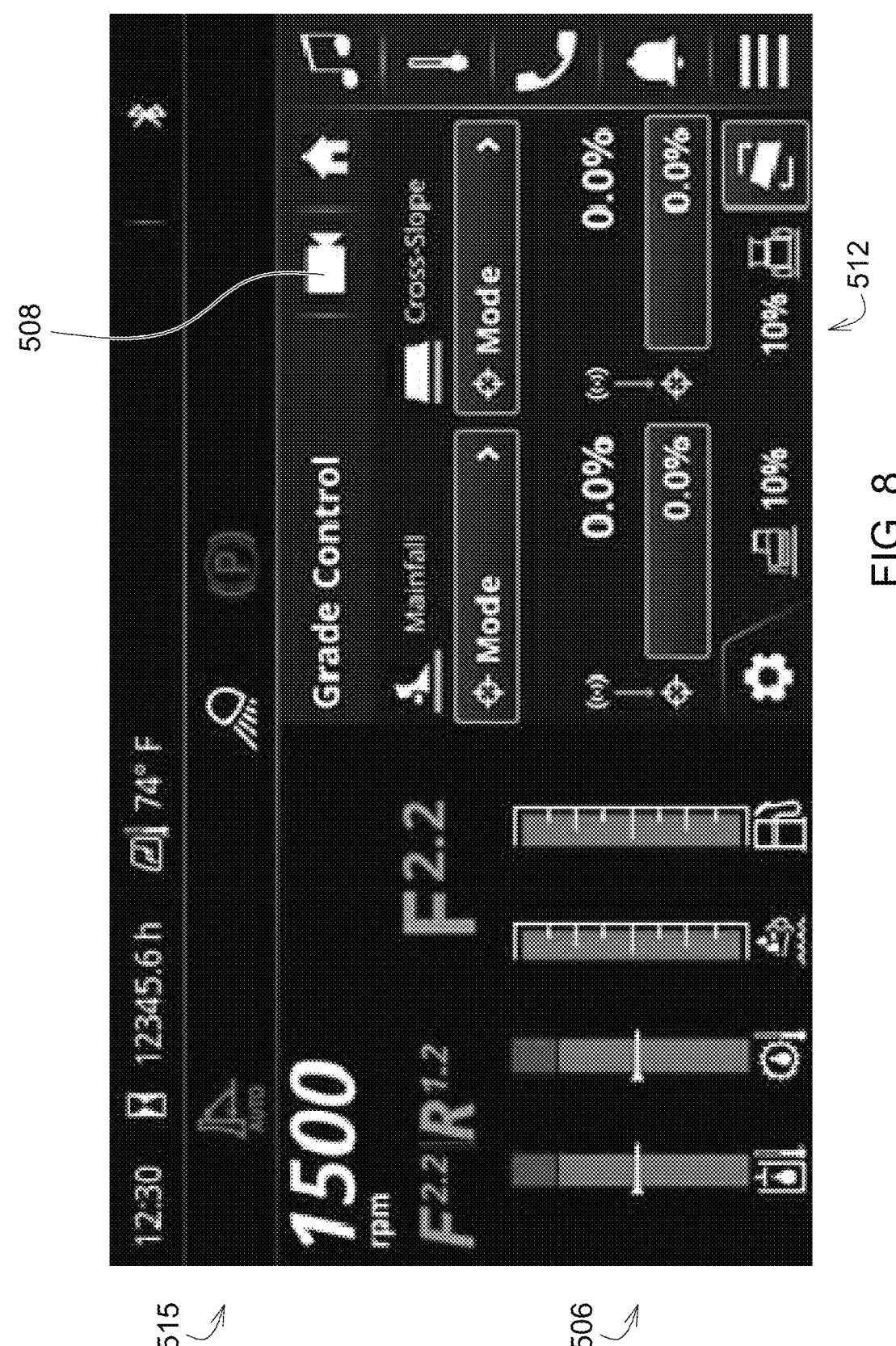
FIG. 8 illustrates a fourth embodiment of a run screen that can be displayed by an electronic device that displays a visual gauge module and machine control settings (e.g., grade control settings).

In FIG. 6 and FIG. 7, the critical ribbon 520 summarizes critical machine health information. The critical ribbon 520 (e.g., critical ribbon container) comprises critical digital readouts, such as primary priority icons (e.g., 801 in FIG. 13), which can indicate oil pressure, oil temperature, coolant level/temperature/status, and fuel level. In other embodiments, the icons (e.g., 801, 802, 803 in FIG. 13) can be representative of or indicative of gauge information by reading vehicle bus data of a vehicle data bus 210, such as controller area network (CAN) bus data, standard J1939 data messages, ISO bus data, or an Ethernet data bus data. The system logic 305 or application module 127 (e.g., application data management module) determines the user interface 117 configuration for the critical ribbon 520 information on the electronic display 115.

Figure 14:
FIG. 14 illustrates a ninth embodiment of a run screen that can be displayed by an electronic device that displays a critical ribbon with a stop warning indicator and stop diagnostic trouble code (DTC) module.
Figure 17:
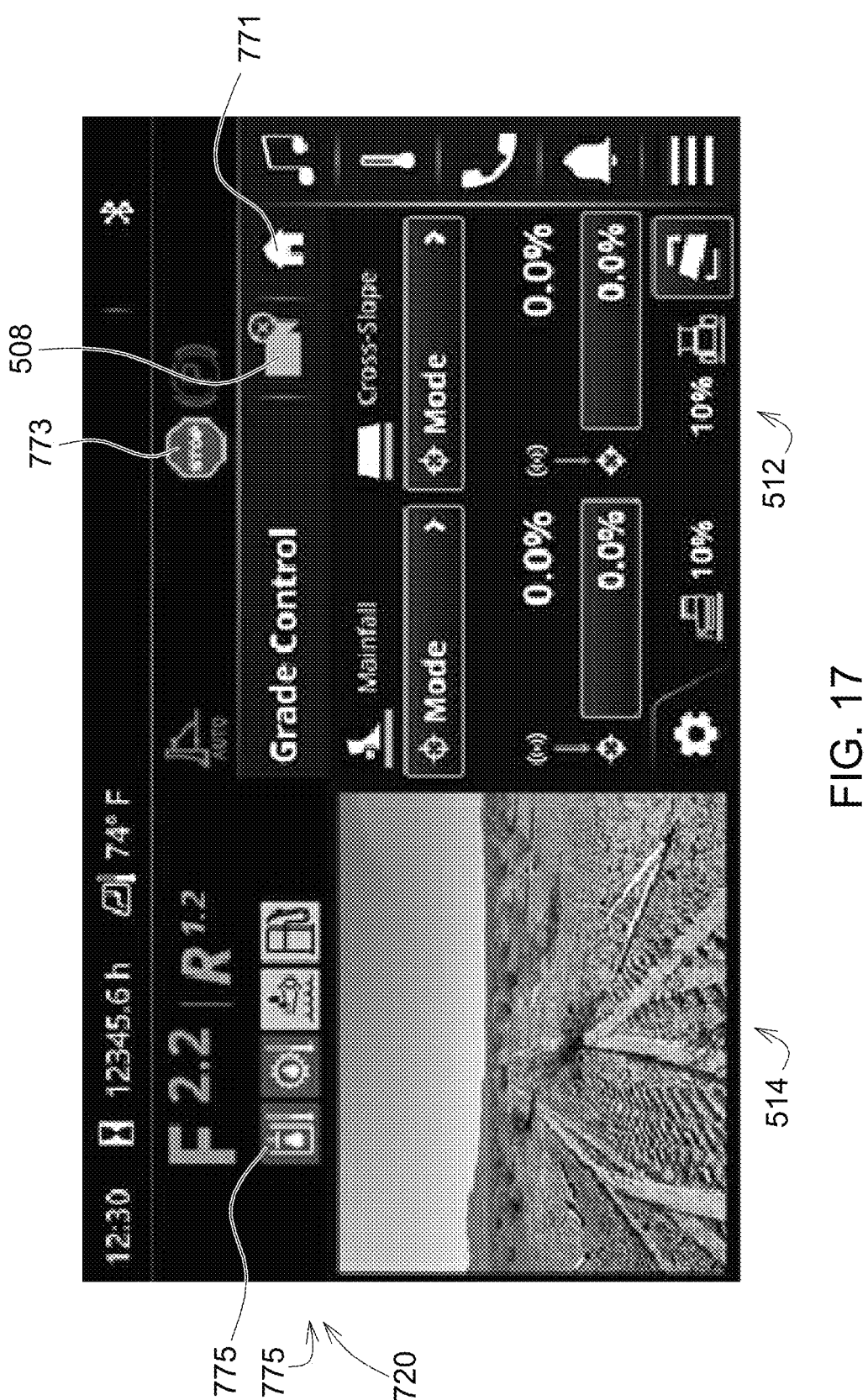
FIG. 17 illustrates a twelfth embodiment of a run screen that can be displayed by an electronic device that displays a critical ribbon with red and yellow warning indicators, an exterior image from a camera, and an application (e.g., grade control application) during normal operation

In the critical ribbon 520 (e.g., critical ribbon container) of FIG. 6 and FIG. 7, gauge information is shown in a normal state or warning state (e.g., critical or alarm state), as indicated by color, blinking icon, a flashing icon or other suitable indicator. In some examples, in or on the critical ribbon (520, 720) an icon indicator in a normal state (e.g., 776) within normal operating levels, may be indicated by a certain color shade (e.g., white), whereas an icon that is outside a normal operating level (e.g., warning indicator 773, 775 in FIG. 17) may be indicated by one or more different color shades (e.g., yellow, orange or red as increasing levels of severity or criticality, as illustrated in FIG. 14 and FIG. 17).

In FIG. 7, the electronic display 115 is operating in the second mode, where both the first application 512 and the second application 514 are simultaneously displayed. Further, in FIG. 7 if the operator selects, touches or activates the application shortcut icon 508 (e.g., camera shortcut icon), the display reverts or returns from the second mode to the first mode, where one application or a first application 512 is displayed. For example, after the operator selects, touches or activates the application shortcut icon 508 in FIG. 7, in response in FIG. 8 the electronic display 115 shows the single run page or a single run page for the first application 512 (e.g., grade control) with an application shortcut icon 508 (e.g., camera application shortcut icon) to conveniently trigger the app-pairing module to pair and display the first application 512 and the second application 514 on a later or different screen in a second mode. Accordingly, if the user presses, touches or activates the application shortcut icon 508, the display will revert to the second mode of FIG. 7, in which the first application 512 and the second application are displayed simultaneously and conveniently to handle related tasks in accordance with user-entered configuration data or a factory setting.

Figure 9:
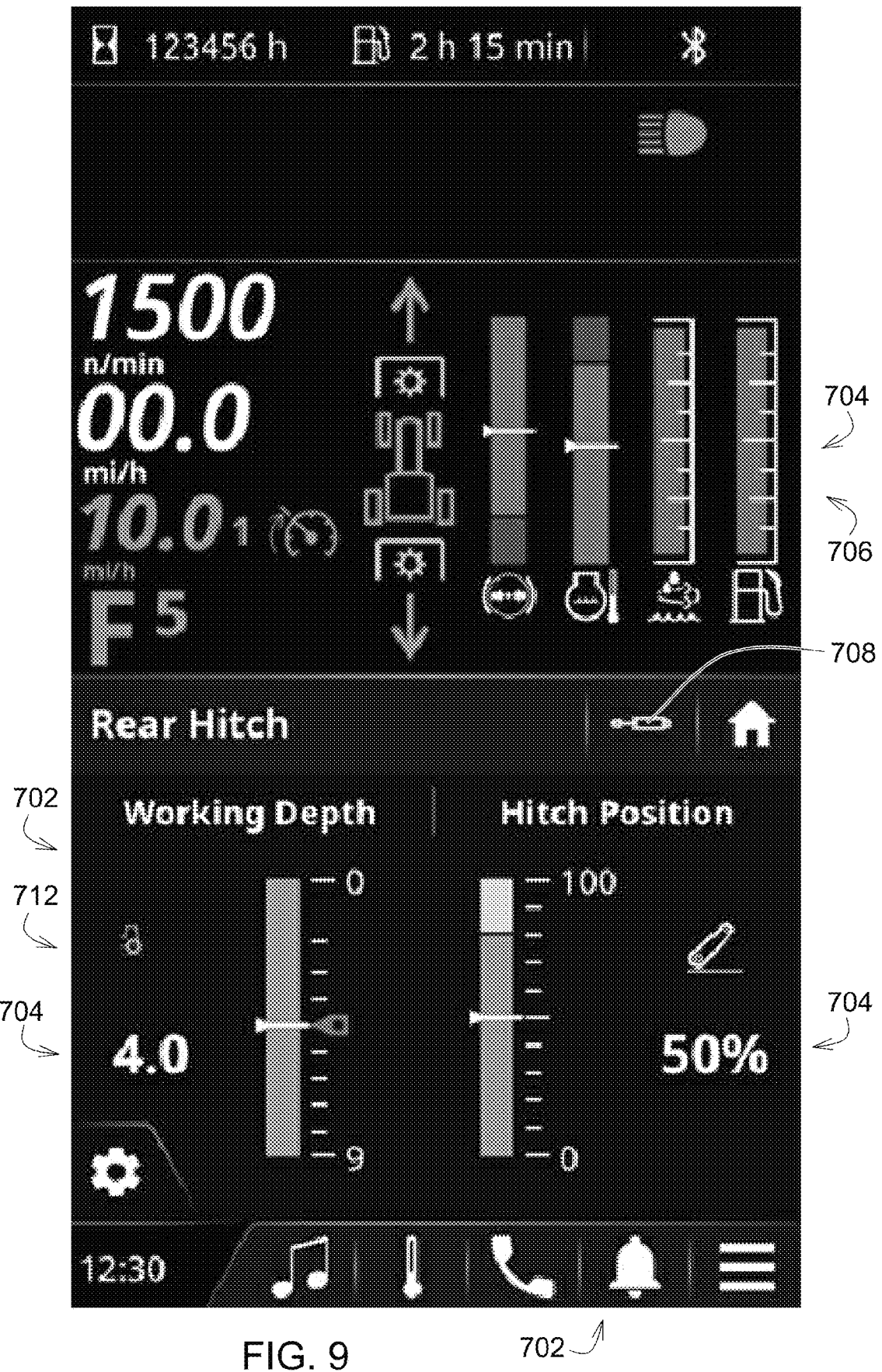
FIG. 9 illustrates a fifth embodiment of a run screen that can be displayed by an electronic device that displays a visual gauge module and machine control settings (e.g., rear hitch settings).

FIG. 9 illustrates a first run page 702 (e.g., first run page or first application 712 for hitch control or limited run page) that is operating in the first mode within first residual container 704 and a visual gauge module 706. Although the first run page 702 of FIG. 9 is displayed in a portrait orientation, the first run page could also be displayed in a landscape orientation in alternate configurations.

Figure 10:
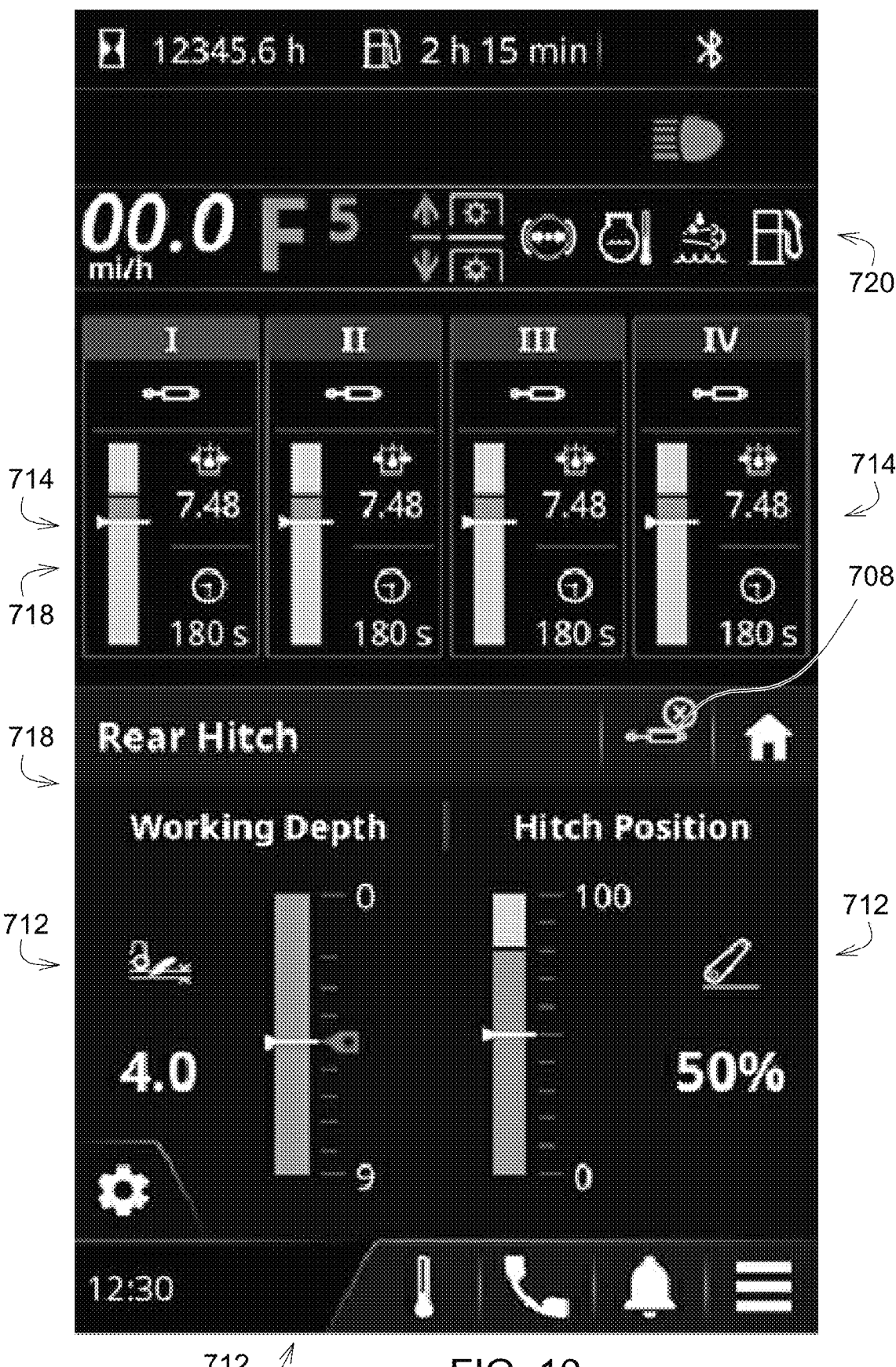
FIG. 10 illustrates a sixth embodiment of a run screen that can be displayed by an electronic device that displays a critical ribbon, a first control application (e.g., hitch control application) and the second application (e.g., hydraulic control application or electrohydraulic valve control application).

Via the user interface 117 and in FIG. 9, the operator is able to switch to a second mode of FIG. 10 that illustrates a second run page (e.g., second run page or second application 714 for grade control or extended run page) within a second residual container 718. Here, in FIG. 9 the operator switches to the second mode of FIG. 10 with the second run page by pressing the application shortcut icon 708 (e.g., hydraulic system control shortcut icon) of FIG. 9, which transitions to the screen of FIG. 10, in which the electronic data processor 120 or app-pairing module 132 is configured to pair and display the first (control) application 712 (e.g., hitch control application) and the second application 714 (e.g., hydraulic control application or electrohydraulic valve control application) simultaneously in the second residual container 718 in the second mode.

Figure 11:
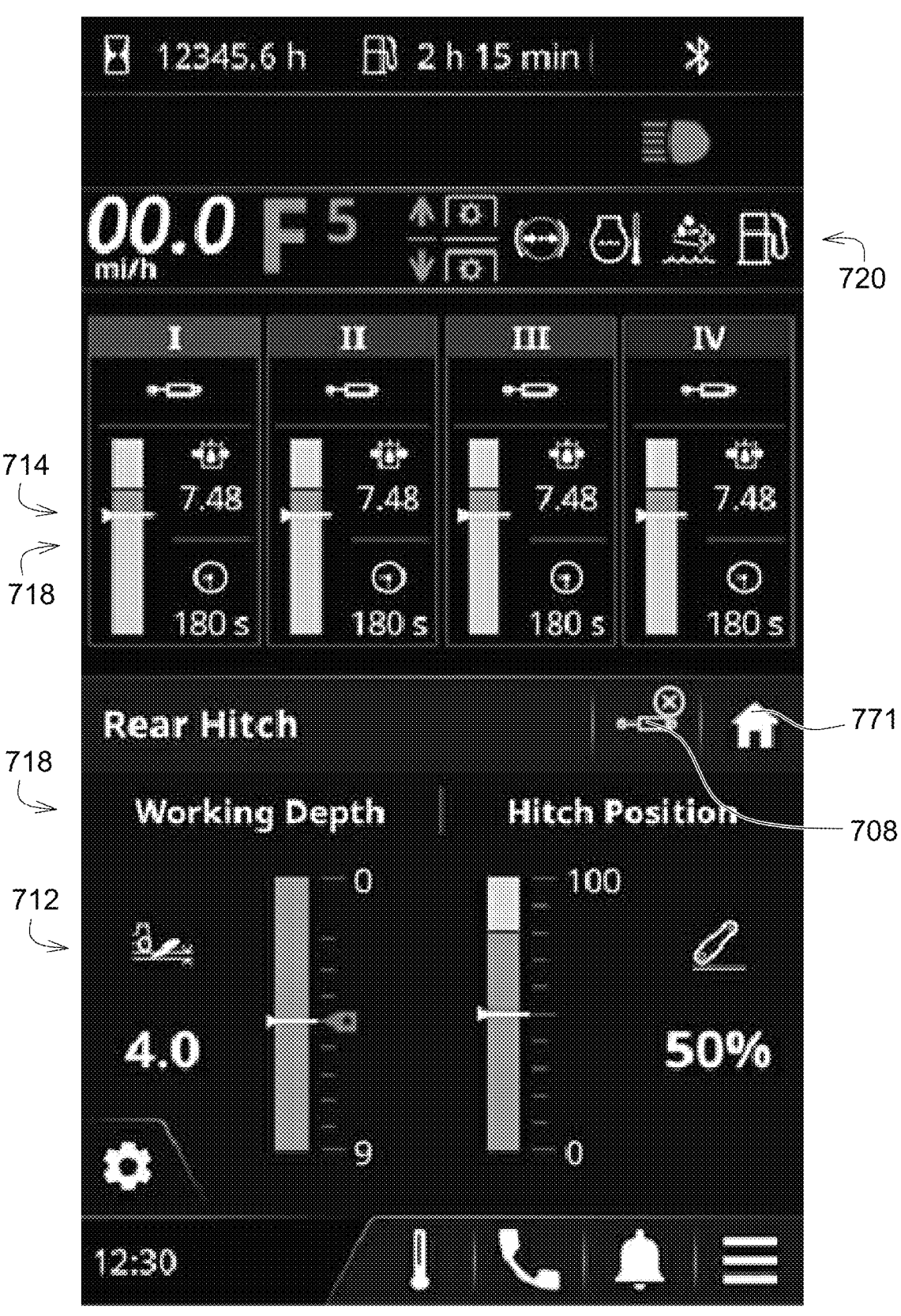
FIG. 11 illustrates a seventh embodiment of a run screen that can be displayed by an electronic device that displays a dual run page for the first application (e.g., rear hitch) and second application with (deactivate) hydraulic control shortcut icon (e.g., hydraulic control application or electrohydraulic valve control application).

In FIG. 10, the critical ribbon 720 (e.g., critical ribbon container) is populated by primary priority icons (e.g., 801 in FIG. 13) that are visible by the operator on the same screen as the first application 712 (e.g., hitch control application or rear hitch control application) and the second application 714 (e.g., hydraulic control application). On the same screen of the electronic display 115, the first application 712 (e.g., hitch control application or rear hitch control application) and the second application 714 (e.g., hydraulic control application) are simultaneously visible for efficient, practical and ergonomic presentation of data that is convenient for the operator of the vehicle (e.g., and grade controlled implement, such as the orientation of a blade of a motor grader or other construction equipment), while reducing the amount of interaction (e.g., number of clicks, pressed or touches) with the display that is necessary (for the operator) to get data for the paired applications and the critical status data (e.g., by the color-indicated state of icons in the critical ribbon 720) for the vehicle, or its implements. The paired applications are configured to ergonomically reduce: (a) the number of clicks per unit time that would otherwise be required to perform a single task or related set of tasks by the vehicle, and/or its implements; and (b) to reduce the operator burden to switch back and forth between functional views of implements (e.g., hitch status and control) and vehicle systems (e.g., hydraulic system status and control) that would otherwise be required to perform a single task or related set of tasks by the vehicle, or its implements. In FIG. 10 and FIG. 11, the first application 712 of the illustrative example provides the working depth and hitch position (e.g., angle) of rear hitch. Meanwhile, FIG. 10 and FIG. 11 illustrate the status of one or more (e.g., up to four) hydraulic valves (I, II, III and IV), such as whether the valves or open, closed or support a particular flow rate of fluid, as indicated by the hydraulic gauges in second application 714 (e.g., hydraulic control application).

Figure 12:
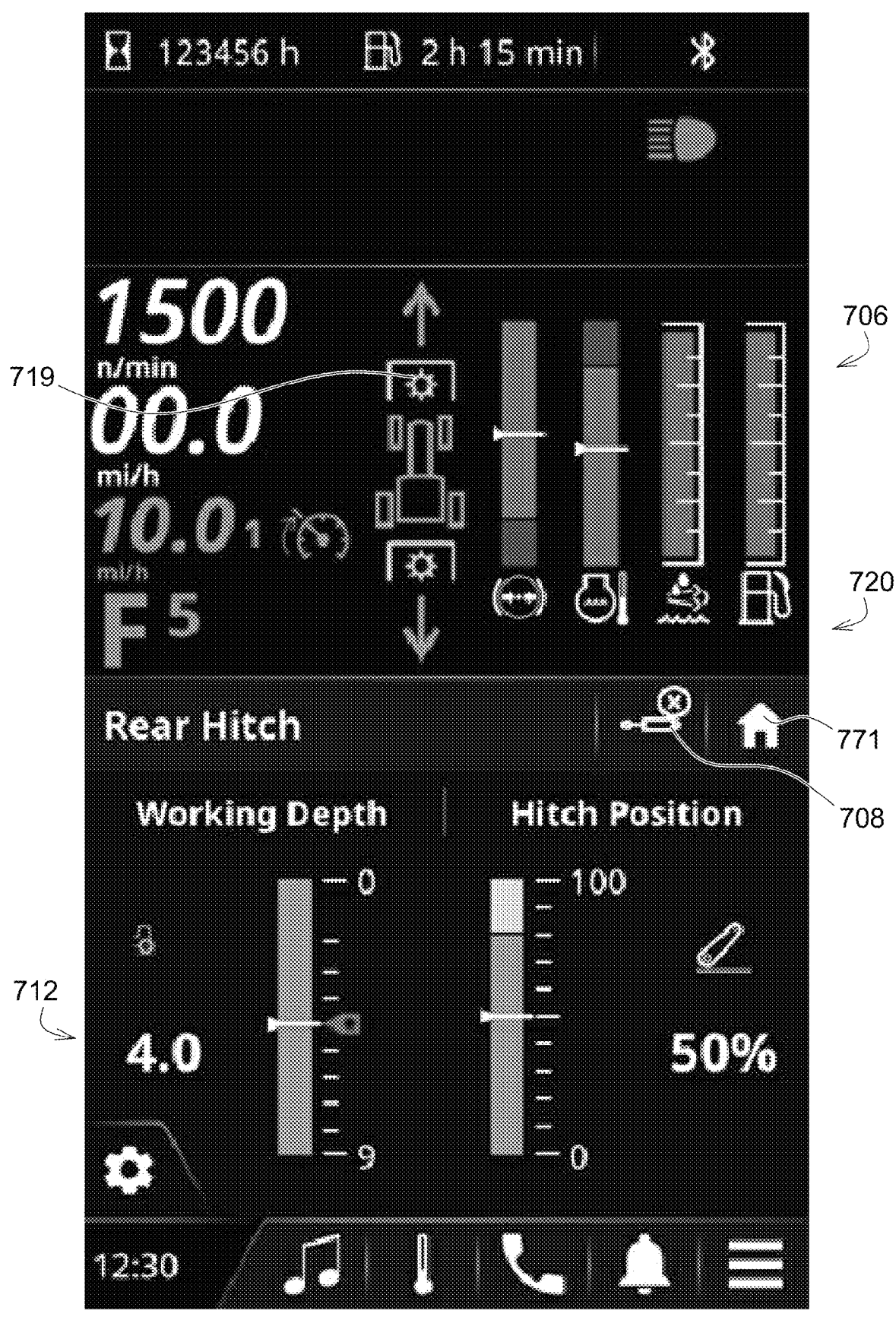
FIG. 12 illustrates an eighth embodiment of a run screen that can be displayed by an electronic device that displays visual gauge module and machine control settings (e.g., rear hitch settings).

In FIG. 11, if the operator selects, touches or activates the application shortcut icon 708 (e.g., hydraulic control shortcut icon), the electronic display 115 reverts or returns the screen from the dually displayed first application 712 and second application 714 of FIG. 11 to the single run page of FIG. 12 or a single run page for the first application 712 (e.g., hitch control) with application shortcut icon 708 (e.g., hydraulic control shortcut icon) of FIG. 12 to conveniently trigger the app-pairing module to sever the pairing or unpair the first application 712 and the second application 714 on a later or different screen in a second mode. Therefore, FIG. 12 displays the first application 712, the visual gauge 706 and the critical ribbon 720 (e.g., critical ribbon container), where the critical ribbon 720 container is populated by some primary priority icons (e.g., 801 of FIG. 13) indicative of vehicle or machine status, such as by reading a vehicle data bus 210 for status of sensors 218, actuators 220 (e.g., electric motors), systems (e.g., 212, 214, 216, battery system, energy storage system, and/or battery management system), implements, and/or components of the vehicle. FIG. 12 illustrates an eighth embodiment of a run screen that can be displayed by an electronic device that displays visual gauge module 706 and machine control settings (e.g., rear hitch settings). FIG. 12 also displays a vehicle icon 719 (e.g., tractor icon) that is representative of the separate and independent rotational states (e.g., on, off, or rotational speed) of a front power take-off shaft and a rear power take-off shaft, where the tachometer symbol and numerical readout adjoining the vehicle icon indicates rotational speed (e.g., revolutions per minute). If a user activates or touches the home shortcut icon 771 (in FIG. 12), the electronic data processor 120, icon manager 133, or run screen manager 135 will return the screen to a home state or home screen, for example.

FIG. 13 illustrates examples of icons that can populate the tell-tale container (e.g., 515, 804, 805) or critical ribbon (520, 720). In some embodiments, the primary priority icons 801 can populate a critical ribbon (520, 720) (e.g., critical ribbon container); one or more primary priority icons 801 and one or more secondary priority icons (e.g., 802, 803) can populate any respective tell-tale container (515, 804, 805). In the first mode, the electronic data processor 120 or icon manager 133 is configured to populate the tell-tale container (515, 804, 805) of a first size with primary priority icons (e.g., 801) and secondary priority icons (e.g., 802, 803) in any order, sequence, permutation or combination, as illustrated in FIG. 13.

FIG. 14 illustrates a ninth embodiment of a run screen that can be displayed by an electronic device that displays a critical ribbon 720, where the priority icons are in a normal state 776 (e.g., white, green, or other factory-defined color indicative of normal state or normal operational status), with a (stop) warning indicator 773 and first application 712 that comprises a (stop/alert) diagnostic trouble code (DTC) module. Via the user interface 117, the operator can select, touch or activate the okay button or reset button 777 to reset the warning indicator 773 and/or to leave, close or to minimize (e.g., run in the background by the electronic data processor) the first application 712 that comprises the (stop/alert) diagnostic trouble code module 777. Further, via the communications interface 110 the user or operator may consult or communicate with a service technician (or forward DTC codes to an individual service technician, a service technical team, or an automated, unmanned, or robotic service) prior to resetting the warning indicator 773 and/or leaving the first application 712.

Figure 15:
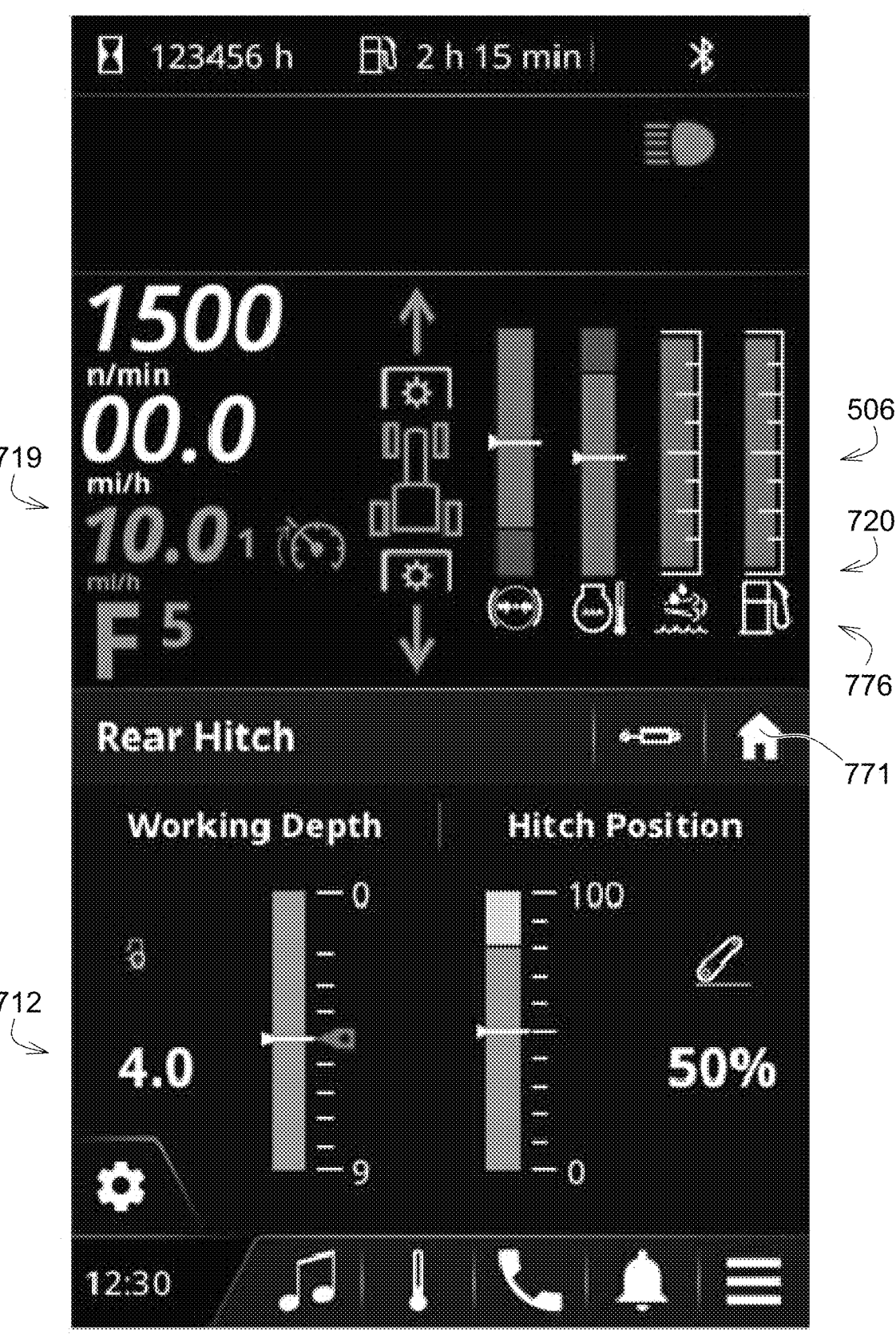
FIG. 15 illustrates a tenth embodiment of a run screen that can be displayed by an electronic device that displays a critical ribbon container, a tractor icon (e.g., with front and rear power take-off shaft), and an application that supports machine control settings (e.g., rear hitch settings).
Figure 16:
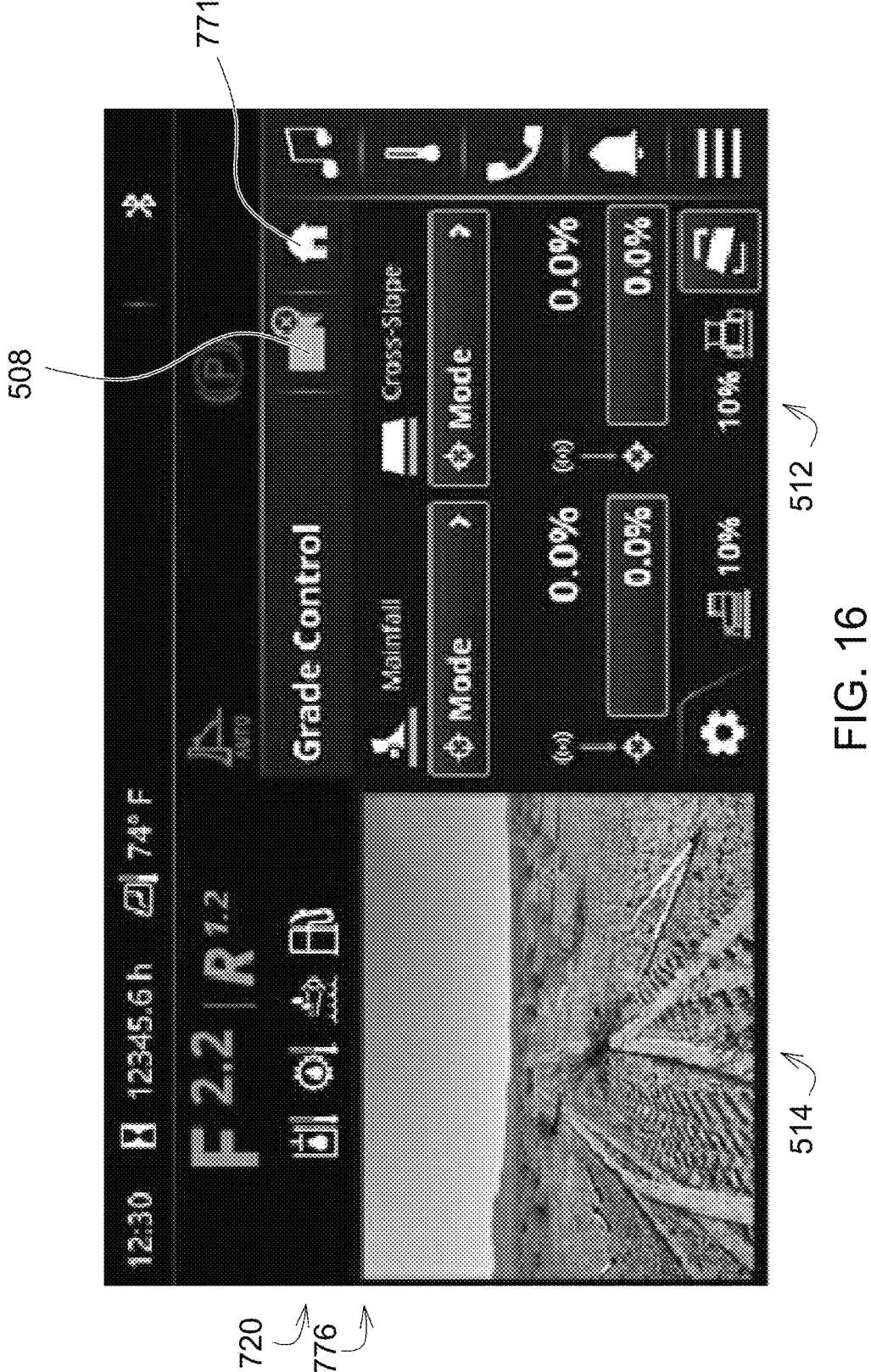
FIG. 16 illustrates an eleventh embodiment of a run screen that can be displayed by an electronic device that displays a critical ribbon, an exterior image from a camera, and an application (e.g., grade control application) during normal operation.

FIG. 15 illustrates a tenth embodiment of a run screen that can be displayed by an electronic display 115 that displays a critical ribbon 720 (e.g., critical ribbon container) as part of the visual gauge module 506, a vehicle actuator (status) icon 719 (e.g., tractor that indicates the rotational states of front and rear power take-off shaft), and a first application 712 that supports machine control settings (e.g., rear hitch settings). The vehicle actuator icon 719, alone or together with the digital numerical readout, may indicate one more of the following: rotational state of a front power take-off shaft, rotational state of the rear power take-off shaft, speed (e.g., expressed in revolutions per minute on the digital numerical readout) of the front power take-off shaft, speed (e.g., expressed in revolutions per minute) of the rear power takeoff shaft, observed torque of the front power take-off shaft, observed torque of the rear power take-off shaft, active state, inactive state, enabled state, or disabled state of the front power take-off shaft, or the rear power take-off shaft. FIG. 16 displays an illustrative screen with a critical ribbon 720 (e.g., critical ribbon container) populated with primary priority icons (e.g., 801), where a color state of each icon can be assigned (e.g., factory-assigned setting) to be indicative of status of the vehicle, its systems, its components, and/or its implements. As illustrated, the color state or status of the primary priority icons is within the normal state 776 (e.g., white or green colored icon). Further, the state (e.g., normal) of each icon is also indicated by the level (and/or color state, such as green or red) within the corresponding bar graph immediately above each icon.

FIG. 16 illustrates an eleventh embodiment of a run screen that can be displayed by an electronic device that displays a critical ribbon 720 (e.g., critical ribbon container) populated with primary priority icons (e.g., 801), where a color state of each icon can be assigned (e.g., factory-assigned setting) to be indicative of status of the vehicle, its systems, its components, and/or its implements. As illustrated, the color state or status of the primary priority icons is within the normal state 776 (e.g., white or green colored icon). To display the status of the primary priority icons (e.g., 801), the electronic data processor 120 may read the data messages 210 provided by vehicle sensor 218, vehicle actuators 220, the location-determining receiver 240, the guidance system 230 or other systems, modules or components that can communicate via the vehicle data bus 210. As shown in FIG. 16, the first application 512 (e.g., grade control) and the second application 514 (e.g., exterior camera images) are simultaneously displayed in accordance with the second mode. The exterior image from the second application 514, such as camera application, and the first application 512 (e.g., grade control application) are consistent with normal operation in the second mode.

In contrast, the electronic data processor 120 changes the states of the critical ribbon 720 container and several primary priority icons from FIG. 16 to FIG. 17, where the display of FIG. 17 displays warning states of the critical ribbon 720 container and several primary priority icons in FIG. 17. FIG. 17 illustrates a twelfth embodiment of a run screen that can be displayed by an electronic device or electronic display 115 that displays a critical ribbon 720 with icons (e.g., 801) in one or more warning indicator states 775 with red and/or yellow warning indicators. In some configurations, the yellow warning indicator or status color of one or more primary priority icons (e.g., 801) in the critical ribbon 720 container may indicate that service is required, but that the machine may be operated until serviced, whereas the red warning indicator or status color of one or more primary priority icons in the critical ribbon 720 (e.g., critical ribbon container), alone or in conjunction with the (stop) warning indicator 773 (e.g., red stop sign symbol), may indicate that service is required as soon as possible and the machine (e.g., off-road vehicle) should be stopped and shut down to avoid potential damage to the machine, its systems, its components, or its implements. Advantageously, in the second mode, the above warning indicators are communicated even while the first application 512 and the second application 514 are running and visible simultaneously on the electronic display 115 for the operator to control and manage the machine (e.g., off-road vehicle) and its implement. For example, the electronic data processor 120 is configured to run a first application 512 that provides machine control (e.g., grade control) and a second application 514 (e.g., exterior camera) that provides an exterior image, video, or stream from one or more cameras during normal operation and during a warning state operation.

Further, in FIG. 17 the tell-tale or critical ribbon 720 (e.g., critical ribbon container 720) is configured to display a warning indicator 773 (e.g., stop symbol) to alert the operator to stop the machine and review: (a) the warning states of the critical ribbon 720 container, (b) the diagnostic trouble codes (DTC) provided by the diagnostic trouble code module or application (e.g., where the DTC module can be referred to as a third application), or both.

Figure 18:
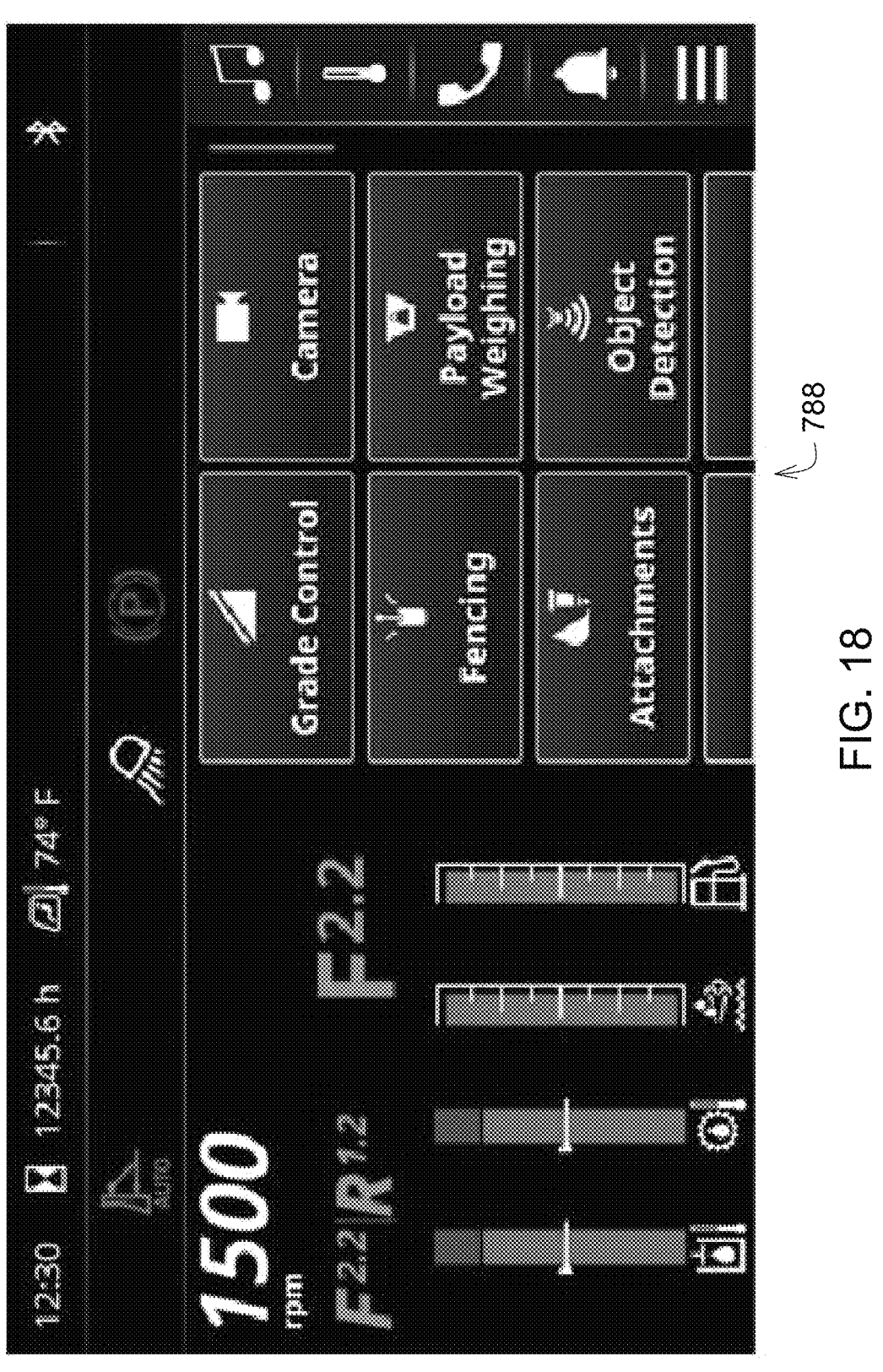
FIG. 18 illustrates a thirteenth embodiment of a run screen that can be displayed by an electronic device that displays visual gauge module and menu of applications.

FIG. 18 illustrates a thirteenth embodiment of a run screen that can be displayed by an electronic device or electronic display 115 that displays visual gauge module 506 and menu 788 (e.g., grid menu, matrix menu or tile menu) of applications. In FIG. 18, a run page home displays a menu 788 of run page tiles, where run page home is navigated to by pressing the home or house shortcut icon 771 on any of the screens illustrated in FIG. 5 through FIG. 20.

Figure 19:
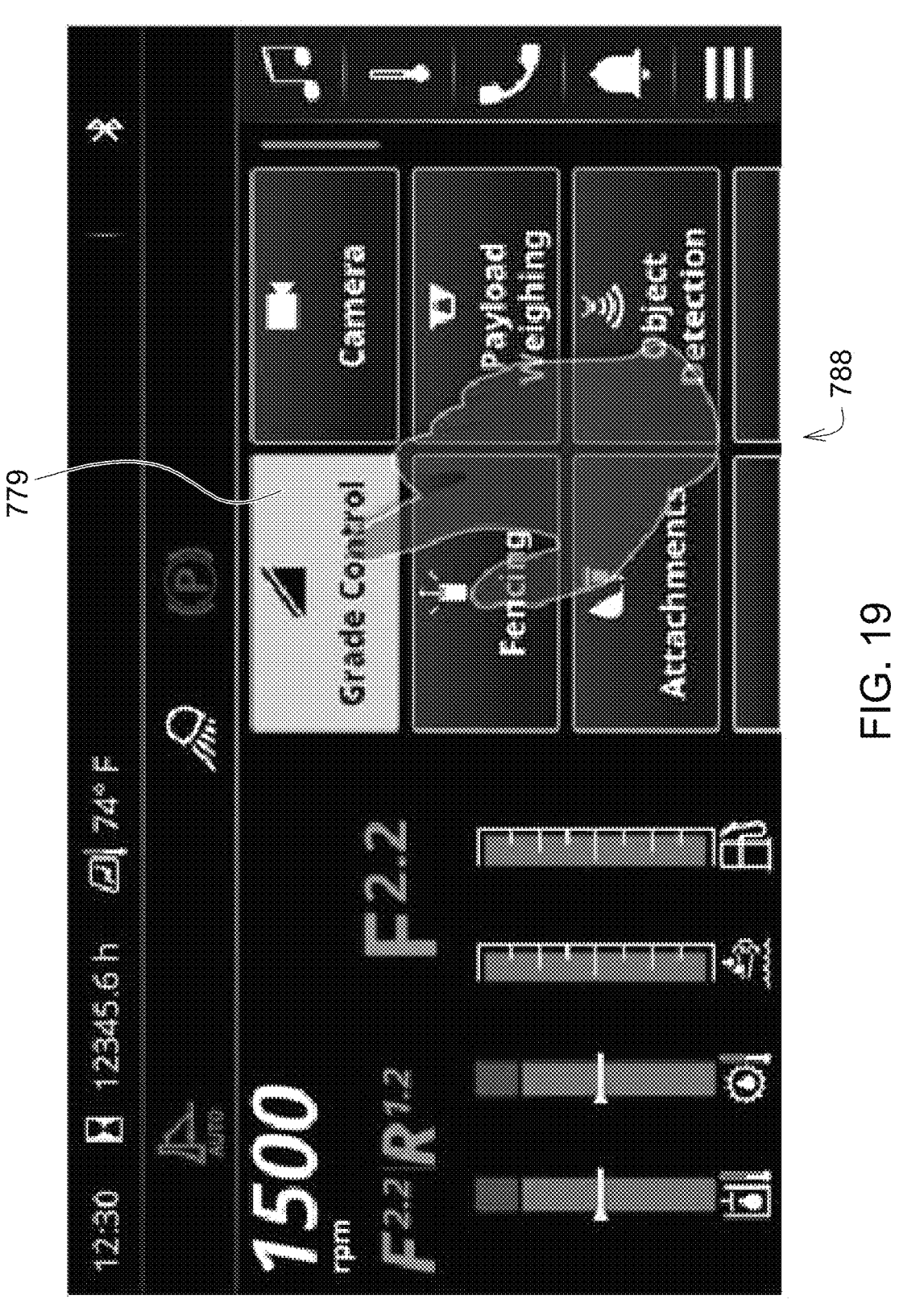
FIG. 19 illustrates a fourteenth embodiment of a run screen that can be displayed by an electronic device that displays a visual gauge module and menu of applications, where a user is activating or pressing a grade control application.

FIG. 19 illustrates a fourteenth embodiment of a run screen that can be displayed by an electronic device or electronic display 115 that displays a visual gauge module 506 and menu of applications 788, where a user or operator is activating or pressing a grade control application 779 (e.g., highlighted, in yellow, in FIG. 19). In FIG. 18 and FIG. 19, the electronic data processor 120 is configured to access or execute the app-pairing module 132, application module 127, or other modules (e.g., software modules in the data storage device 125) to determine a menu structure of menu 788, such as combination, order or arrangement of run page tiles (e.g., with central icons) are generated by reconfigurable data pairings allowing operators (users) to easily navigate between run pages that are specific to their work views. The run page tiles may be configured (e.g., by factory settings or user-defined settings) to illustrate run page (application) name, application icon, and application error/failure status indicators 118, where the app-pairing module 132 and the system logic 305 are configured to populate the attributes.

Figure 20:
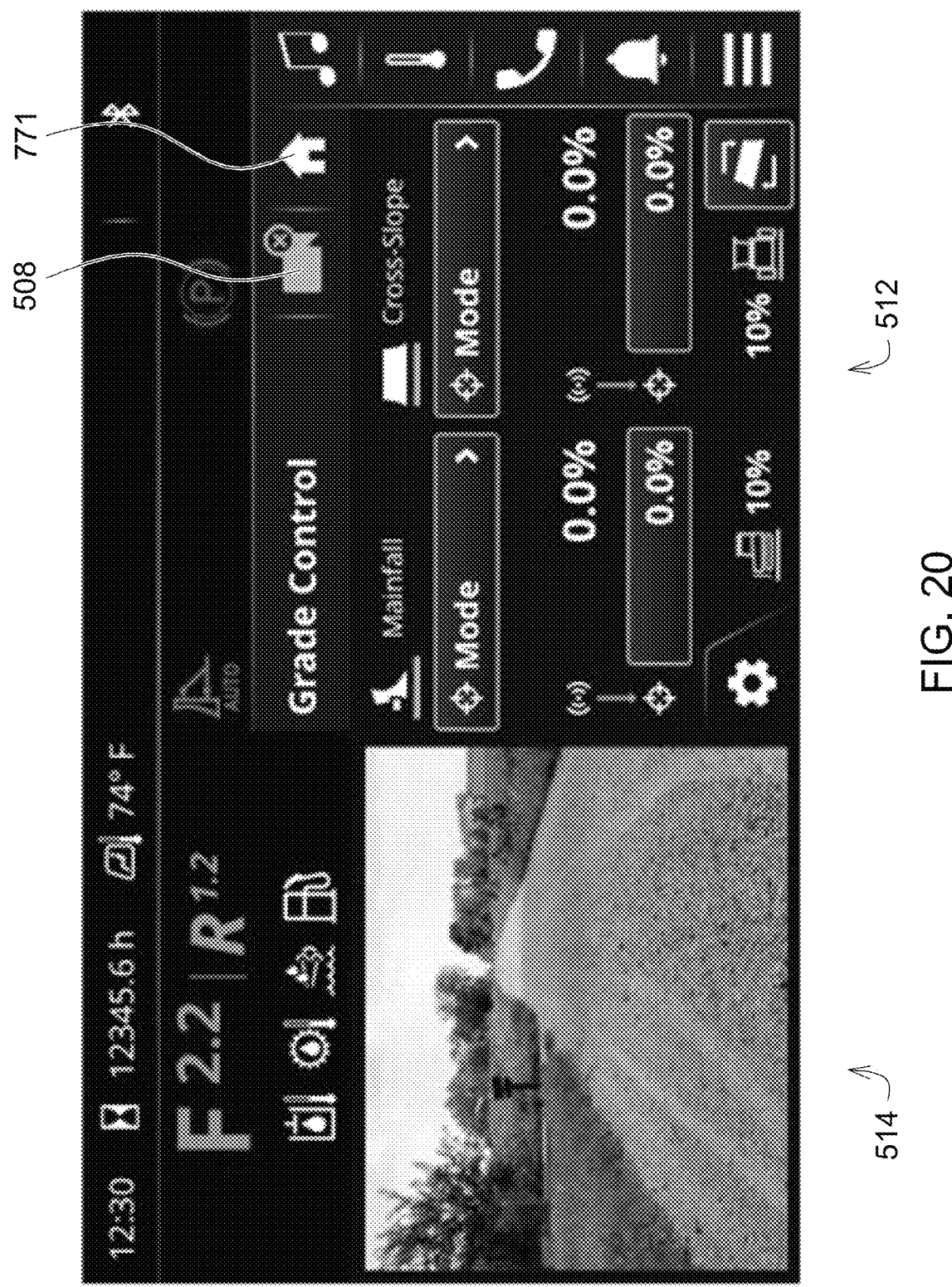
FIG. 20 illustrates a fifteenth embodiment of a run screen that can be displayed by an electronic device that displays tell tail indicator, an exterior image, and an application (e.g., grade control application).

In FIG. 19, the grade control application 779 or run page is selected by pressing the tile labeled with the target control application 779 (e.g., grade control), where the app-pairing module 132 may respond or serve: (a) single application on a run page in the first mode or (b) a set of paired applications simultaneously on a single screen of the graphical user interface 117, such as set forth on FIG. 20, which can follow the screen of FIG. 19. FIG. 20 illustrates a fifteenth embodiment of a run screen that can be displayed by an electronic device that displays a tell tail indicator or a critical ribbon (520 or 720), an exterior image (e.g., exterior with respect to the vehicle or machine) or sequence of images, video or stream from a second application 514, and a first application 512 (e.g., grade control application).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A computer implemented method to improve the display of graphical data on an electronic display, the method comprising:

establishing a layout on the electronic display in which to position a tell-tale container in a first mode along with a first residual container, a critical ribbon along with a second residual container in a second mode;

determining the display mode, among the first mode and second mode, based on user input comprising user-inputted control states, user-inputted actuator states and machine-provided sensor states provided by reading a vehicle data bus or sensor data communication;

in the first mode populating the tell-tale container of a first size with primary priority icons and secondary priority icons;

in the second mode populating the critical ribbon container of a second size solely with primary priority icons, where the first size is greater than the second size by a first size difference, and populating an app container in the second residual container with an application;

displaying the populated tell-tale container in the first mode in conjunction with the first residual container or the populated critical ribbon in the second mode in conjunction with the second residual container responsive based on the determination of the display mode, wherein the first residual container is resized into the second residual container of greater size than the first residual information; and in the second mode, populating the second residual container with a paired group of related applications based on related machine functions that are factory-defined, such that the paired group of related applications are displayed simultaneously in the second residual container of the second mode.

2. The method according to claim 1 wherein the paired group of related applications comprises the motor grader control app module and an outside-facing camera app module.

3. The method according to claim 1 wherein the paired group of related applications comprise the hitch app control module and hydraulic control value app module.

4. A computer implemented method to improve the display of graphical data on an electronic display, the method comprising:

establishing a layout on the electronic display in which to position a tell-tale container in a first mode along with a first residual container, a critical ribbon along with a second residual container in a second mode;

determining the display mode, among the first mode and second mode, based on user input comprising user-inputted control states, user-inputted actuator states and machine-provided sensor states provided by reading a vehicle data bus or sensor data communication;

in the first mode populating the tell-tale container of a first size with primary priority icons and secondary priority icons;

in the second mode populating the critical ribbon container of a second size solely with primary priority icons, where the first size is greater than the second size by a first size difference, and populating an app container in the second residual container with an application;

displaying the populated tell-tale container in the first mode in conjunction with the first residual container or the populated critical ribbon in the second mode in conjunction with the second residual container responsive based on the determination of the display mode, wherein the first residual container is resized into the second residual container of greater size than the first residual information; and in the second mode, populating the second residual container with a paired group of related applications based on related machine functions that are factory-defined, such that initial one of the paired group of related applications is displayed simultaneously with a shortcut icon to other one of the paired group of related applications in the second residual container of the second mode, wherein the shortcut icon can be selected, activated or triggered to instantly switch to the other one of the paired group of related applications in the second residual container that is active on the display while the initial one is hidden on the display.

5. The method according to claim 4 wherein the paired group of related applications comprises the motor grader control app module and an outside-facing camera app module.

6. The method according to claim 4 wherein the paired group of related applications comprise the hitch app control module and hydraulic control value app module.

* * * * *